United States Patent
Bloy et al.

(10) Patent No.: US 11,688,003 B2
(45) Date of Patent: Jun. 27, 2023

(54) SYSTEM AND METHOD FOR INTEGRATED APPLICATION AND PROVISIONING

(71) Applicant: The Toronto-Dominion Bank, Toronto (CA)

(72) Inventors: Adrian Bloy, Ottawa (CA); Daniel Lam Tin Cheung, Richmond Hill (CA); Asgar Maleki, Toronto (CA); Kevin Yuen, Toronto (CA); Danielle Marie Mullenax, Gatineau (CA)

(73) Assignee: The Toronto-Dominion Bank, Toronto ( * ) Notice: Subject to any disclaimer, the term of this patent is extended or adjusted under 35 U.S.C. 154(b) by 0 days.

(21) Appl. No.: 16/135,278

(22) Filed: Sep. 19, 2018

(65) Prior Publication Data

US 2019/0087894 A1 Mar. 21, 2019

Related U.S. Application Data

(63) Continuation-in-part of application No. 15/708,887, filed on Sep. 19, 2017, now Pat. No. 11,367,070.

(51) Int. Cl.
*G06Q 40/03* (2023.01)
*G06Q 20/36* (2012.01)
(Continued)

(52) U.S. Cl.
CPC ........... *G06Q 40/03* (2023.01); *G06F 40/174* (2020.01); *G06Q 20/10* (2013.01);
(Continued)

(58) Field of Classification Search
CPC ..... H04L 67/1097; H04L 67/34; G06F 9/547; G06Q 20/401
See application file for complete search history.

(56) References Cited

U.S. PATENT DOCUMENTS 5,699,527 A 12/1997 Davidson
6,088,686 A 7/2000 Walker et al.
(Continued)

FOREIGN PATENT DOCUMENTS

WO 2005010731 2/2005
WO WO-2013083939 A1 * 6/2013 ............. G06Q 40/02

OTHER PUBLICATIONS

M. A. Sirbu, "Credits and debits on the Internet," in IEEE Spectrum, vol. 34, No. 2, pp. 23-29, Feb. 1997, doi: 10.1109/6.570823. (Year: 1997) (Year: 1997).*

(Continued)

*Primary Examiner* — Neha Patel
*Assistant Examiner* — Jahed Ali
(74) *Attorney, Agent, or Firm* — Fish & Richardson P.C.

(57) ABSTRACT

The present disclosure involves systems, software, and computer implemented methods for generating new credit accounts for immediate availability for use in current online transaction. One example process includes identifying, at a merchant application, a request to perform a credit application process associated with a particular user via a client application. The credit application process is associated with a financial institution, and the merchant application stores a set of user accounts, each associated with a merchant-specific identifier identifying the particular user profile at the merchant. An interactive application is presented within the merchant application, and information associated with the completed application is transmitted to an API associated with the financial institution with the merchant-specific identifier of the associated user. A payment credential for a newly created credit account is received, and can be associated with the user profile corresponding to the merchant-specific identifier.

19 Claims, 6 Drawing Sheets

(51) Int. Cl.
*G06Q 20/10* (2012.01)
*G06Q 20/32* (2012.01)
*G06F 40/174* (2020.01)

(52) U.S. Cl.
CPC ..... *G06Q 20/1085* (2013.01); *G06Q 20/3223* (2013.01); *G06Q 20/36* (2013.01)

(56) References Cited

U.S. PATENT DOCUMENTS

| | | | |
|---|---|---|---|
| 6,185,543 | B1 | 2/2001 | Galperin et al. |
| 6,366,892 | B1* | 4/2002 | Altman ................. G06Q 40/03 705/38 |
| 7,249,097 | B2* | 7/2007 | Hutchison ............. G06Q 20/02 705/39 |
| 7,620,597 | B2 | 11/2009 | Eze |
| 7,680,728 | B2 | 3/2010 | Lazerson |
| 7,801,807 | B2 | 9/2010 | DeFrancesco et al. |
| 7,818,399 | B1 | 10/2010 | Ross, Jr. et al. |
| 7,953,861 | B2 | 5/2011 | Yardley et al. |
| 8,352,370 | B1* | 1/2013 | White ................... G06Q 40/02 705/44 |
| 9,082,119 | B2* | 7/2015 | Ortiz ................... G06Q 20/3278 |
| 9,558,492 | B2 | 1/2017 | Carrott |
| 9,697,517 | B1* | 7/2017 | Chambers ............ G06Q 20/24 |
| 9,779,405 | B1* | 10/2017 | Krausz ............... G06Q 20/3829 |
| 10,235,668 | B1* | 3/2019 | Ellis ................... G06Q 20/047 |
| 10,417,706 | B1* | 9/2019 | Simon ................. G06F 3/04817 |
| 10,740,737 | B2* | 8/2020 | Pareek ................. G06Q 20/40 |
| 10,853,791 | B1 | 12/2020 | Ellis et al. |
| 2003/0101116 | A1 | 5/2003 | Rosko et al. |
| 2003/0191714 | A1 | 10/2003 | Norris |
| 2004/0030645 | A1* | 2/2004 | Monaghan ............ G06Q 20/10 705/40 |
| 2005/0077349 | A1* | 4/2005 | Bonalle ................ G06Q 20/10 235/380 |
| 2005/0165684 | A1* | 7/2005 | Jensen ................ G06Q 20/40 705/44 |
| 2006/0165060 | A1 | 7/2006 | Dua |
| 2007/0050289 | A1 | 3/2007 | Zeller et al. |
| 2008/0058014 | A1* | 3/2008 | Khan ................ G06Q 20/3278 455/558 |
| 2008/0126244 | A1 | 5/2008 | Loving et al. |
| 2008/0243593 | A1* | 10/2008 | Ko ..................... G06Q 30/0224 707/E17.014 |
| 2009/0171839 | A1* | 7/2009 | Rosano ................ G06Q 20/12 705/40 |
| 2009/0240947 | A1 | 9/2009 | Goyal et al. |
| 2009/0254440 | A1* | 10/2009 | Pharris .................... H04L 63/08 705/17 |
| 2009/0313536 | A1* | 12/2009 | Karidi .................. G06F 16/972 715/209 |
| 2010/0138344 | A1* | 6/2010 | Wong .................. G06Q 20/10 705/44 |
| 2011/0087595 | A1* | 4/2011 | Sabella ................. G06Q 20/32 705/44 |
| 2012/0215605 | A1* | 8/2012 | Gardner ............... G06Q 30/0229 705/14.17 |
| 2012/0215609 | A1* | 8/2012 | Yoo ................... G06Q 30/0238 705/14.23 |
| 2012/0290486 | A1* | 11/2012 | Dobrowolski ......... G06Q 50/16 705/307 |
| 2012/0296824 | A1* | 11/2012 | Rosano ............... G06Q 20/102 705/44 |
| 2013/0124349 | A1* | 5/2013 | Khan ................ G06Q 20/3278 705/21 |
| 2013/0159154 | A1* | 6/2013 | Purves ................. G06Q 20/363 705/35 |
| 2013/0185192 | A1* | 7/2013 | McGuire .............. G06Q 20/384 705/39 |
| 2013/0238500 | A1* | 9/2013 | Moore .................. G06F 21/34 705/44 |
| 2014/0058834 | A1* | 2/2014 | Liberty ............... G06Q 30/0225 705/65 |
| 2014/0070001 | A1 | 3/2014 | Sanchez et al. |
| 2014/0108263 | A1* | 4/2014 | Ortiz .................. G06Q 20/3223 705/71 |
| 2014/0279552 | A1* | 9/2014 | Ortiz .................. G06Q 20/3278 705/65 |
| 2015/0032627 | A1* | 1/2015 | Dill ............... H04L 9/32 705/44 |
| 2016/0034891 | A1* | 2/2016 | Carpenter ............. G06Q 20/40 705/44 |
| 2016/0048822 | A1 | 2/2016 | Forrest |
| 2016/0071094 | A1 | 3/2016 | Krishnaiah et al. |
| 2016/0117670 | A1* | 4/2016 | Davis ................ G06Q 20/3255 705/39 |
| 2016/0173473 | A1* | 6/2016 | Naccache ............ G06Q 20/401 726/5 |
| 2016/0217464 | A1 | 7/2016 | Jajara et al. |
| 2016/0232600 | A1* | 8/2016 | Purves ................. G06Q 20/351 |
| 2016/0269898 | A1 | 9/2016 | Kueh |
| 2016/0335688 | A1* | 11/2016 | Wang ............... G06Q 20/38215 |
| 2016/0350849 | A1 | 12/2016 | Lynch |
| 2016/0358250 | A1 | 12/2016 | Dogin et al. |
| 2016/0364795 | A1* | 12/2016 | Bhagat ................ G06Q 20/24 |
| 2016/0379192 | A1* | 12/2016 | Purves ................ G06Q 20/28 705/41 |
| 2017/0017957 | A1 | 1/2017 | Radu |
| 2017/0017958 | A1* | 1/2017 | Scott .................. G06Q 20/12 |
| 2017/0109736 | A1* | 4/2017 | Heiman ............. G06Q 20/3821 |
| 2017/0161735 | A1* | 6/2017 | Ortiz ................ G06Q 20/36 |
| 2017/0228704 | A1 | 8/2017 | Zhou et al. |
| 2017/0270603 | A1* | 9/2017 | Berta ................. G06Q 20/4037 |
| 2017/0278089 | A1* | 9/2017 | Kothari ............. G06Q 20/3223 |
| 2017/0286768 | A1 | 10/2017 | Livesay et al. |
| 2018/0018660 | A1* | 1/2018 | Gomes ............. G06Q 20/3821 |
| 2018/0020348 | A1 | 1/2018 | Peterson et al. |
| 2018/0075527 | A1 | 3/2018 | Nagla et al. |
| 2018/0082284 | A1* | 3/2018 | Gomes ................ G06Q 20/36 |
| 2018/0082303 | A1 | 3/2018 | Chan-bauza et al. |
| 2018/0137508 | A1* | 5/2018 | Shah .................. G06Q 20/36 |
| 2018/0174138 | A1* | 6/2018 | Subbarayan ....... G06Q 20/3674 |
| 2018/0183737 | A1* | 6/2018 | Subbarayan ....... G06Q 20/3223 |
| 2018/0189756 | A1* | 7/2018 | Purves ............... G06Q 20/105 |
| 2018/0276656 | A1 | 9/2018 | Goyal et al. |
| 2018/0330459 | A1* | 11/2018 | Elder ................ G06Q 20/3674 |
| 2019/0087809 | A1* | 3/2019 | Bloy .................. G06Q 20/227 |
| 2019/0197231 | A1 | 6/2019 | Meier |
| 2019/0251542 | A1 | 8/2019 | Sjoberg et al. |
| 2019/0273607 | A1 | 9/2019 | Van Der Velden et al. |
| 2019/0310837 | A1 | 10/2019 | Zmijewski et al. |
| 2020/0007336 | A1 | 1/2020 | Wengel |
| 2020/0118205 | A1 | 4/2020 | Bloy et al. |
| 2020/0265435 | A1 | 8/2020 | Bankston et al. |
| 2020/0302081 | A1 | 9/2020 | Faitelson et al. |
| 2020/0327529 | A1 | 10/2020 | Mukherjee et al. |
| 2020/0372600 | A1* | 11/2020 | Bloy ............... H04L 63/0815 |
| 2021/0133704 | A1* | 5/2021 | Bloy .................. G06Q 20/3672 |
| 2021/0279795 | A1 | 9/2021 | Bloy et al. |
| 2022/0092715 | A1 | 3/2022 | Bloy et al. |
| 2022/0164779 | A1 | 5/2022 | Bloy et al. |
| 2022/0318782 | A1 | 10/2022 | Bloy et al. |

OTHER PUBLICATIONS

Envestnet [online] Yodlee Risk Insight for Pre-Qualification Mar. 19, 2019 retrieved from URL <https://resources.yodlee.com/risk-insights/envestnet-yodlee-risk-insight-for-pre-qualification> 2 pages.
Urrico "Emphasizing Account Opening, Cybersecurity & Consumer Experience" Date of Publication: Jul. 31, 2018; retrieved from URL <https://www.cutimes.com/2018/07/31/emphasizing-account-opening-cybersecurity-consumer/?slreturn=20180929060828> 2 pages.
Mnuchin, et al., "A Financial System That Creates Economic Opportunities Nonbank Financials, Fintech, and Innovation" Date of Publication: Jul. 18, 2018. retrieved from URL <https://home.treasury.gov/sites/default/files/2018-08/A-Financial-System-that-Creates-Economic-Opportunities---Nonbank-Financials-Fintech-and-Innovation_0.pdf> 222 pages.
U.S. Appl. No. 16/416,698, Bloy et al., Integration of Workflow with Digital ID, filed May 20, 2019, 43 of pages.

(56) References Cited

OTHER PUBLICATIONS

U.S. Appl. No. 16/670,427, Bloy et al., Integrated Credit Application and Merchant Transaction Including Concurrent Visualization of Transaction Details, filed Oct. 31, 2019, 48 of pages.
Afteracademy.com [online], "What is a TCP 3-Way Handshake Process?" Feb. 2020, [retrieved on Jun. 29, 2021], retrieved from: URL <https://afteracademy.com/blog/what-is-a-tcp-3-way-handshake-process>, 9 pages.
Techopeida.com [online], "Three-Way Handshake" Nov. 2020, [retrieved on Jun. 29, 2021], retrieved from : URL <https://www.techopedia.com/definition/10339/three-way-handshake>, 5 pages.
Otjacques et al., "Interoperability of e-government information systems: Issues of identification and data sharing." Journal of management information systems 23.4, May 2007, 24 pages.
Sirbu et al., "Credits and debits on the Internet." IEEE spectrum 34. Feb. 2, 1997, 7 pages.
Chan et al., "Designing a Credit Approval System Using Web Services, BPEL, and AJAX." 2009 IEEE International Conference on e-Business Engineering. IEEE, Oct. 2009, 8 pages.

\* cited by examiner

SYSTEM AND METHOD FOR INTEGRATED APPLICATION AND PROVISIONING

CROSS-REFERENCE TO RELATED APPLICATIONS

This application is a continuation-in-part application of and claims the benefit of priority to U.S. patent application Ser. No. 15/708,887, filed on Sep. 19, 2017, the contents of which are hereby incorporated by reference.

TECHNICAL FIELD

The present disclosure relates to computer-implemented methods, software, and systems for providing application and provisioning operations associated with an institution within ongoing online interactions with one or more merchants transactions, allowing new lines of credit to be immediately available within the current transaction as well as transactions with other merchants.

BACKGROUND

Online and e-commerce transactions are ubiquitous in today's society. Many merchants, including those with brick and mortar locations, have found more and more of their sales to be delivered via online or connected channels. Using merchants' online platforms, customers may use their existing payment methods to complete transactions.

New credit applications typically result in a period of time during which an initial transaction may be available or allowable in response to a credit application acceptance and usage. However, the generated card may only be available for the single usage, and may not be available for future transactions. Further, any credit account may result in contingent liability on the part of the providing merchant. Further, in traditional credit card interactions, a physical card may need to be received by the customer before transactions can occur.

SUMMARY

The present disclosure involves systems, software, and computer-implemented methods for providing credit application and provisioning operations associated with a financial institution within ongoing online interactions with one or more merchant transactions. A first example system includes a communications module, at least one memory storing instructions and a repository storing a set of user accounts associated with a plurality of users, and at least one at least one hardware processor interoperably coupled with the at least one memory and the communications module. The plurality of users can each be associated with a user profile, and each user profile can be associated with a merchant-specific identifier identifying the user profile at the merchant. In the system, the instructions can instruct the at least one hardware processor to perform various operations. For example, a request to perform a credit application process associated with a particular user can be identified at a merchant application, where a particular user accesses the merchant application via a client application, and where the credit application process is associated with a particular institution. A first signal can be transmitted, via the communications module, where the first signal includes an instruction to redirect the client application to a credit application site associated with the institution to perform a credit application process at the institution. A second signal can also be transmitted via the communications module, and can include or identify the merchant-specific identifier of the particular user and a request to perform the credit application process at the institution. A third signal can be received via the communications module from the credit application site, where the third signal includes an approval associated with the credit application process, a payment credential associated with a new credit account created at the particular institution in response to the approval of the credit application process, and the merchant-specific identifier of the particular user. The received payment credential can then be associated with or to the user profile associated with the user corresponding to the received merchant-specific identifier.

Implementations can optionally include one or more of the following features.

In some instances, the first signal is transmitted to a device running the client application, and the second signal is transmitted to the credit application site after the client application performs the redirection to the credit application site.

In some instances, the first signal and the second signal comprises a single signal, wherein the merchant-specific identifier and the request to perform the credit application process at the institution are embedded or included within the redirection instruction. In some of those instances, the instruction to redirect the client application to the credit application site may comprise a hyperlink to the credit application site, where the merchant-specific identifier and the request to perform the credit application process are included or embedded as parameters in the hyperlink to the credit application site.

In some instances, associating the received payment credential to the user profile associated with the user corresponding to the received merchant-specific identifier can include storing the received payment credential to a proprietary wallet associated with the user corresponding to the received merchant-specific identifier.

In some instances, the credit application process performed by the institution can include receiving, via the client application, user input associated with an application for credit associated with the credit application process. A credit adjudication process can be performed for the user based on information included in the application for credit, and, in response to approval of the application for credit by the credit adjudication process, the new credit account can be created at the institution for the user, where the credit account is associated with a unique credit account identifier. Then, a fourth signal including the payment credentials of the created credit account can be transmitted to the merchant application, wherein the payment credentials correspond to the unique credit account identifier associated with the created credit account. In some of those instances, the second signal further includes a set of user information from the user profile of the particular user, wherein at least a part of the user information is pre-populated into the application for credit prior to receiving the user input.

In some instances, the request to perform a credit application process is received in association with a data exchange to be performed at the merchant application. In those instances, the instructions can further instruct the at least one hardware processor to automatically perform the data exchange associated with the credit application process using the received payment credential in response to associating the received payment credential to the user profile. In some of those instances, the data exchange can comprise a transaction associated with the merchant application.

In some instances, the received payment credential can be a personal account number and expiration date of a payment card associated with the new credit account. In other instances, the received payment credential comprises a payment token associated with the new credit account.

In some instances, receiving the third signal comprises receiving the third signal via at least one application programming interface associated with the merchant application.

A second example system can include a communications module, at least one memory storing instructions and a repository storing a set of user accounts associated with a plurality of users, and at least one at least one hardware processor interoperably coupled with the at least one memory and the communications module. The plurality of users can each be associated with a user profile, and each user profile can be associated with a merchant-specific identifier identifying the user profile at the merchant. In the system, the instructions can instruct the at least one hardware processor to perform various operations. For example, a request to perform a credit application process associated with a particular user can be identified at a merchant application, where a particular user accesses the merchant application via a client application, and where the credit application process is associated with a particular institution. An interactive form associated with a credit application for the particular institution can be presented, via a user interface, within the merchant application. A first signal including information associated with the completed interactive form associated with the credit application and a merchant-specific identifier of the user can be transmitted, via the communications module and to a device having an application programming interface (API) associated with the institution. The API can be associated with a credit application process performed by the institution. A second signal including an approval associated with the credit application process, a payment credential associated with a new credit account created at the institution in response to the approval of the credit application process, and the merchant-specific identifier of the particular user can be received via the communications module and from the institution. The received payment credential can be associated with or to the user profile associated with the user corresponding to the received merchant-specific identifier.

Implementations can optionally include one or more of the following features.

In one example, presenting the interactive form associated with a credit application for the particular institution can include accessing the user profile of the particular user to obtain a set of personally identifiable information associated with the particular user and pre-populating at least a portion of the interactive form with at least a portion of the obtained set of personally identifiable information. In some of those instances, the instructions may further instruct the at least one hardware processor to receive, via a user interface, additional user input providing additional information to the interactive form associated with the credit application.

In some instances, the credit application process performed by the institution can include receiving the second signal via the API associated with the institution, performing a credit adjudication process for the user based on information included in the second signal, and creating the new credit account at the institution for the user in response to approval of the application for credit by the credit adjudication process. The credit account can be associated with a unique credit account identifier. A third signal can then be transmitted to the merchant application including the payment credentials of the created credit account, wherein the payment credentials correspond to the unique credit account identifier associated with the created credit account.

In some instances, the received payment credential include a personal account number and expiration date of a payment card associated with the new credit account. In other instances, the received payment credential comprises a payment token associated with the new credit account.

In some instances, receiving the second signal comprises receiving the second signal via at least one application programming interface associated with the merchant application.

In some instances, associating the received payment credential included in the second signal to the user profile associated with the user corresponding to the received merchant-specific identifier includes storing the received payment credential to a proprietary wallet associated with the user profile corresponding to the received merchant-specific identifier.

In some instances, the request to perform a credit application process is received in association with a data exchange to be performed at the merchant application, and the instructions can further instruct the at least one hardware processor to automatically perform the data exchange using the received payment credential after associating the received payment credential to the user profile. In those instances, the data exchange may comprise a transaction associated with the merchant application.

In some instances, presenting the interactive form associated with the credit application for the particular institution can include requesting, via the API associated with the institution, a set of fields required for inclusion in the credit application, receiving, in response to the request, the set of fields required for inclusion in the credit application, and dynamically generating the interactive form associated with the credit application, wherein the dynamically generated interactive form includes the received set of fields required for inclusion in the credit application.

Similar operations and processes associated with each example system may be performed in a different systems comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
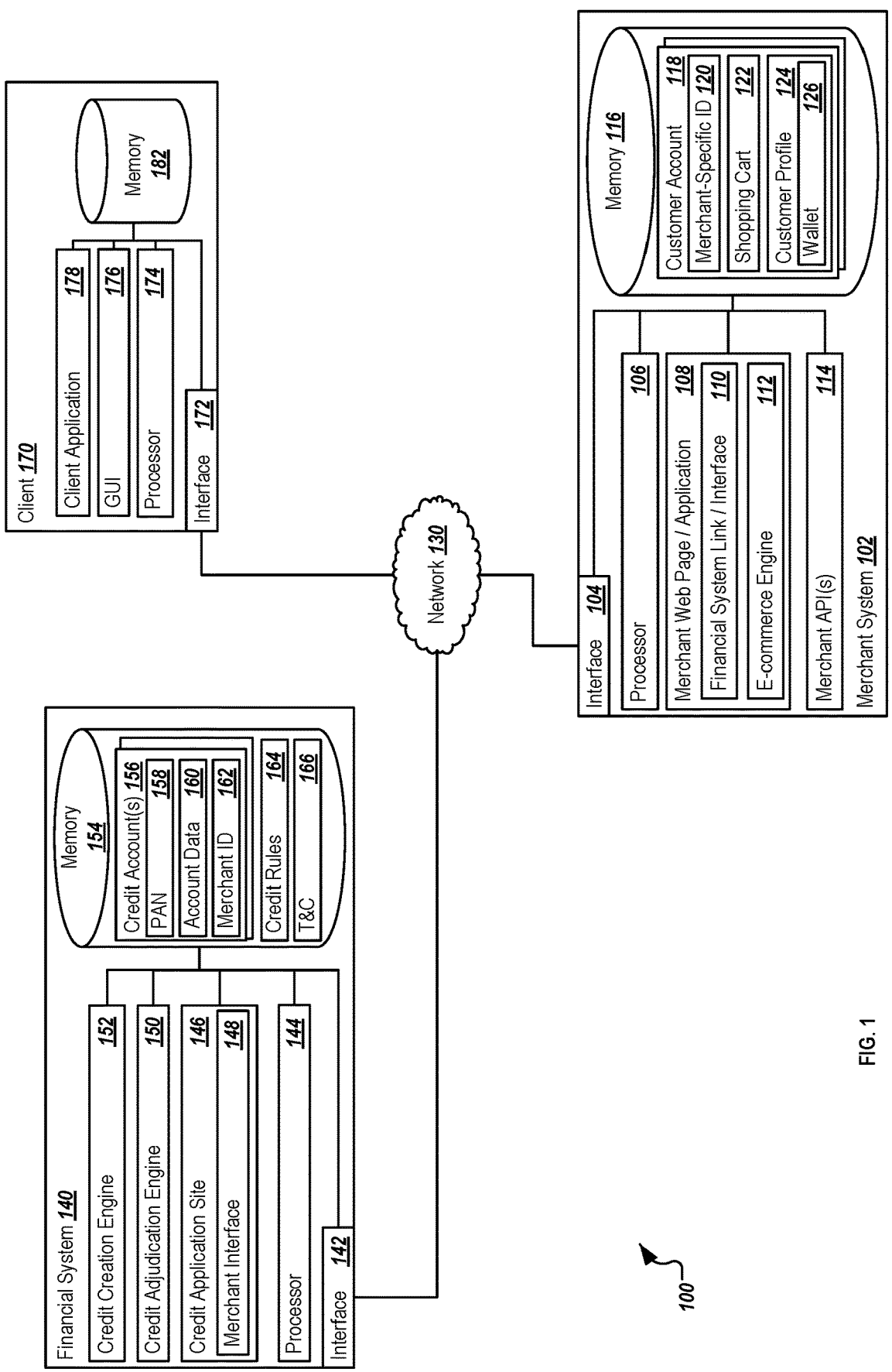
FIG. 1 is a block diagram illustrating an example system for providing credit application and provisioning operations associated with a financial institution within ongoing online interactions with one or more merchant transactions in a first implementation.

The present disclosure describes various tools and techniques associated with providing credit application and provisioning operations associated with a financial institution within ongoing online interactions with one or more merchant transactions, allowing new lines of credit and credit accounts (e.g., credit card accounts, etc.) to be immediately available within the current transaction as well as transactions with other merchants. Users or customers (referred to herein as "users" or "customers", interchangeably) may be associated with or may transact business with one or more merchants, and therefore may be associated with one or more merchant-specific accounts. Each of those accounts may, in some instances, be associated with a proprietary merchant wallet storing payment information (e.g., credit card, payment credentials, and other payment card data, etc.) that can be used to pay for and complete transactions at the merchant's online platforms and websites. A number of applications and purchase patterns and techniques are described herein, and can be used to provide users with the ability to apply for credit from a third-party financial institution associated with the merchant with whom they are transacting or potentially transacting business.

In an example situation, a user, B, may be interacting with a clothing and apparel merchant X via X's online website. User B may be a known and/or registered user associated with merchant X from prior interactions and transactions. During those transactions, B may have provided some personal identifying information, such as a name, an email, and, in some cases, one or more methods of payment, among other information. In some instances, those methods of payment can be stored by merchant X in a proprietary wallet available to each customer, where the proprietary wallet stores information on payment methods and credentials used previously at the merchant, and which can be used again without needing to reenter the information (e.g., except where needed to reauthenticate or confirm the identity of the corresponding user). The personally identifying information can be managed within a user profile, which can be associated with and identified by a unique customer identification (ID), such as a login credential or a merchant-specific identification number or value (hereinafter, "merchant-specific ID").

As B shops or interacts with merchant X's platform, one or more items can be added to an online shopping cart prior to purchase. At any time during the transaction, merchant X may offer B and other customers the opportunity to apply for, and immediately pay for the transaction with, a new credit account provided by a financial institution associated with or in a relationship with merchant X. The offer may be provided after one or more items have been placed into an electronic shopping cart for the user, or before any items are selected as potential purchases. For example, a particular financial institution and merchant X may have an agreement to provide offers for a merchant-branded credit card account, where the account can be used at merchant X as well as other merchants and providers. Prior to the current solution, any such offer may be contingently used by the merchant X to allow an initial purchase using the new credit account, but would require further processing and completion of the application process to allow further usage of the card, and to remove any contingent liability from the merchant and/or the financial institution issuing the account. However, in the current solutions described herein, an immediate credit adjudication process can be initiated via the merchant platform via one or more patterns of action, and can be immediately accepted or rejected at the financial institution after the information associated with the credit application are submitted. Payment credentials associated with that adjudication can then be received at the merchant and immediately associated with the customer's account, allowing those credentials to be used in a current or future transaction without delay.

In a first solution, the credit application process can be managed by a site apart from the merchant platform, such as a credit application and sales site managed by the particular financial institution associated with the credit application. In such instances, in response to determining that an application for credit is requested by the user, the user can be redirected or transferred to a custom application or website associated with the financial institution and merchant X. In this solution, merchant X may initiate the process by providing user B's merchant-specific ID to the custom application through the link or redirection. In some instances, additional information associated with the user from the merchant X may be provided to at least partially pre-populate information needed for a credit application to be considered. The credit application can be linked to the user's merchant-specific ID so that any credit decisions can be returned to merchant X and immediately applied to the user's account. In some instances, the custom application may receive a first set of information from merchant X, and may subsequently request additional information from merchant X before completing the application. Any number of interactions between the merchant X and financial institution may be used in different instances.

Once redirected to the custom application or website, the user can complete any information associated with the credit application not included from merchant X, and can confirm that any included information is correct. As noted, additional information may be requested from the merchant system before completing the application, or a request to the user to allow access to additional merchant information may be provided. Once the application is done, the user can complete and submit the credit application, which can be managed by a credit adjudication process and system of the financial institution. In response to approval of credit for the user, the credit adjudication process (or the custom application or website) can interact with a backend provisioning system to create a new credit account specific to the user. In connection with new credit account, a new set of payment and/or credit credentials can be generated. In some instances, the credentials may be an account number, which may be or may be associated with a personal account number (PAN) and an expiration date that can be used as payment credentials. In some instances, the credit credentials may be linked to the merchant-specific ID, or to a payment token generated for use by the merchant in future transactions, where the token is associated with the new credit account.

Once approved and the new account is open, the custom application or credit application and sales site can redirect the user back to the merchant website and/or platform, while concurrently, sequentially, or in parallel, providing the new account information back to merchant X. The provision of the new account information can include an identification of the merchant-specific ID, allowing the merchant X to associate the current user account with the new credit account in the merchant's systems and particular user account profile. The new account information can include, for example, an indication of the approval and creation of the new account, as well as information that can be used to perform and process the current and/or future transactions. For example, a specific credit card number and expiry may be included in the communication back to the merchant X, or alternatively, a payment token registered to and corresponding to the new account may be provided. That payment and account information can be stored in or provisioned to the user's wallet with merchant X, and, if a transaction is being performed, can be used to process that current transaction. In a separate and following operation, a new payment instrument associated with the new credit account can be created and sent to the user at a suitable address via any available delivery mechanism, allowing the user to continue using the new credit account at any merchants or providers accepting the credit.

In a second solution, merchant X may provide the credit application on its own platform for purposes of the credit application. Using one or more application programming interfaces (APIs) exposed by the backend financial institution, the information collected in the application process can be transferred to the backend system and processed without causing the user to leave merchant X's website or platform. At the backend, information including the merchant-specific ID and the application-relevant information can be passed to the credit adjudication system for a credit issuance analysis. In response to an approval being received, the credit adjudication system (or another backend process) can cause a new credit account to be opened based on the application. The new credit account may be linked to the merchant-specific ID, or may be separate therefrom. The backend system can transmit information associated with the credit adjudication (i.e., approved credit and an amount) and the newly opened account (e.g., a specific account number or a number and expiry of an associated credit card account or PAN) back to merchant X (e.g., via one or more APIs made available by merchant X), where merchant X can then provision the new payment credentials associated with the new account to a propriety merchant wallet for future or current use.

The second solution may be designed by merchant X, for example, within a mobile app provided by the merchant, a website associated with the merchant, or a point-of-sale (POS) at which a transaction is being processed, such as in a brick-and-mortar location of the merchant, among other options. In such instances, information associated with an existing account at the merchant can be used to populate at least a portion of the credit application, and simple inputs from the customer may be received to complete the application. Upon submission, the merchant application may send the information, via a connected network, to one or more of the APIs associated with the financial institution. Any suitable mechanism for processing transactions, collecting application input, and connecting the corresponding backend APIs can be used to perform the operations in the second solution.

During or after the transmission, terms and conditions providing required disclosures for the new credit account may be presented by the merchant based on local and federal laws and regulations. In some instances, an additional API of the financial institution, or the same API, may be used to allow a dynamic determination of the proper disclosures to be presented via the merchant application in association with the application. For example, based on a call from merchant X, the financial institution can obtain the proper disclosures and/or terms and conditions, and can provide those to the merchant application for presentation to the user. In other instances, or in addition, the fields required for a particular credit application may be dynamically determined by the financial institution based on the calling application, and can be returned to the merchant application prior to the creation of the credit application form. The form can then be generated dynamically based on the identified fields to be included as determined by the financial institution. Using this additional API call, the solution can allow merchants and their applications to present the most up-to-date credit application and disclosure information, ensuring the proper data is presented and collected during the process without requiring the merchant to modify or update their systems. In other instances, updated application forms and disclosure information can be regularly obtained by the merchant application, such as by pulling the data from the financial institution at regular intervals, receiving push updates from the financial institution in response to changes to either, or in any suitable manner.

Turning to the illustrated example implementation, FIG. 1 is a block diagram illustrating an example system 100 for providing credit application and provisioning operations associated with a financial institution within ongoing online interactions with one or more merchant transactions in a first implementation. Specifically, the illustrated implementation is directed to a solution where a merchant site initiates an offer for a credit application associated with a backend financial institution, where the merchant site can redirect users to perform the credit application at an external site associated with the financial institution. The redirection allows the intake of information for the credit application to be performed at a credit application site 146, also referred to as a credit sales site. The credit application can be submitted through financial system 140, credit can be determined as approved by a credit adjudication engine 150, and a new account can be created for the user. Information about that new account can then be securely transmitted back to the merchant site, where payment credentials associated with the new account can be stored in a proprietary, or merchant-managed, wallet or user profile. Those payment credentials can immediately be used for performing a current transaction, as well as one or more additional transactions.

In general, the system 100 allows the illustrated components to share and communicate information across devices and systems (e.g., merchant system 102, financial system 140, and client 170, among others, via network 130). As described herein, the financial system 140 and/or merchant system 102 may be cloud-based components or systems (e.g., partially or fully), while in other instances, non-cloud-based systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, financial system 140, merchant system 102, and client 170 may be any computer or processing devices such as, for example, a blade server, general-purpose personal computer (PC), Mac®, workstation, UNIX-based workstation, or any other suitable device. Moreover, although FIG. 1 illustrates a single financial system 140 and a single merchant system 102, either or both of the systems 140, 102 can be implemented using a single system or more than those illustrated, as well as computers other than servers, including a server pool. In other words, the present disclosure contemplates computers other than general-purpose computers, as well as computers without conventional operating systems. Similarly, the client 170 may be any system that can request data and/or interact with the merchant system 102 and the financial system 140. The client 170, also referred to as client device 170, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™ Android™, Windows Phone OS, or iOS™, among others. The client 170 may include one or more merchant- or financial institution-specific applications executing on the client 170, or the client 170 may include one or more Web browsers or web applications that can interact with particular applications executing remotely from the client 170, such as the merchant web page or application 108 and/or the credit application site 146, among others.

The merchant system 102 may be associated with a particular merchant, and may be associated with or part of an e-commerce site at which a user can interact to perform one or more shopping or purchase transactions, such as through the merchant web page and/or backend application 108. The merchant system 102 may, for instance, be associated with a shopping application through which a shopping cart 122 can be filled with items offered by the merchant, and through which a transaction purchasing those goods or services in the shopping cart 122 can be performed. In the current implementation, the merchant system 102 may be associated with or store a proprietary wallet 126 associated with registered users, where the proprietary wallet 126 can store payment information for the user to allow quicker and more efficient transactions to be performed. Each user may be associated with one of a plurality of customer accounts 118, where each customer account 118 is associated with a merchant-specific identifier (ID) 120. The merchant-specific ID 120 can be in any suitable format, and may include any characters used to create a unique identifier for a particular user. The customer account 118 can further include or store a customer profile 124, which can include personally identifiable information (PII) of the corresponding user or customer. That information may include a name, address, and relevant information, including demographic information, employment information, and customer preferences, among others.

As illustrated, the merchant system 102 includes or is associated with interface 104, processor(s) 106, the merchant web page or application 108, one or more merchant APIs 114, and memory 116. While illustrated as provided by or included in the merchant system 102, parts of the illustrated contents may be separate or remote from the merchant system 102, or the merchant system 102 may be distributed.

The interface 104 of the merchant system 102 is used by the merchant system 102 for communicating with other systems in a distributed environment—including within the environment 100—connected to the network 130, e.g., financial system 140, client 170, and other systems communicably coupled to the illustrated merchant system 102 and/or network 130. Generally, the interface 104 comprises logic encoded in software and/or hardware in a suitable combination and operable to communicate with the network 130 and other components. More specifically, the interface 104 may comprise software supporting one or more communication protocols associated with communications such that the network 130 and/or interface's hardware is operable to communicate physical signals within and outside of the illustrated environment 100. Still further, the interface 104 may allow the merchant system 102 to communicate with the client 170, the financial system 140, and/or other portions illustrated within the merchant system 102 to perform the operations described herein.

Network 130 facilitates wireless or wireline communications between the components of the environment 100 (e.g., between the merchant system 102, the financial system 140, the client(s) 170, etc.), as well as with any other local or remote computers, such as additional mobile devices, clients, servers, or other devices communicably coupled to network 130, including those not illustrated in FIG. 1. In the illustrated environment, the network 130 is depicted as a single network, but may be comprised of more than one network without departing from the scope of this disclosure, so long as at least a portion of the network 130 may facilitate communications between senders and recipients. In some instances, one or more of the illustrated components (e.g., the merchant system 102, the financial system 140, etc.) may be included within or deployed to network 130 or a portion thereof as one or more cloud-based services or operations. The network 130 may be all or a portion of an enterprise or secured network, while in another instance, at least a portion of the network 130 may represent a connection to the Internet. In some instances, a portion of the network 130 may be a virtual private network (VPN). Further, all or a portion of the network 130 can comprise either a wireline or wireless link. Example wireless links may include 802.11a/b/g/n/ac, 802.20, WiMax, LTE, and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

The merchant system 102, as illustrated, includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the merchant system 102. Specifically, the processor 106 executes the algorithms and operations described in the illustrated figures, as well as the various software modules and functionality, including the functionality for sending communications to and receiving transmissions from the financial system 140 and clients 170, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the merchant system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The merchant system 102, as noted, can include, among other components, one or more applications, entities, programs, agents, or other software or similar components capable of performing the operations described herein. As illustrated, the merchant system 102 includes or is associated with a merchant web page or application 108. The merchant web page or application 108 (referred to as either the merchant web page 108 or the merchant application 108) may be any application, program, other component, or combination thereof that is associated with a merchant and is used to provide e-commerce functionality associated with the offer of goods and services of the merchant. The merchant application 108 may be a web-based application or website, and can be accessed by a dedicated mobile application executing at a client 170, or through web-based interactions transmitted via a web browser or general-purpose application. In some instances, the merchant application 108 may provide to users one or more offers for credit, where the credit is ultimately provided by the financial system 102. In some instances, these offers may be made while a user or customer is interacting with the merchant application 108, and particularly, where one or more items have been added to a shopping cart 122. In some instances, the offer for credit may be associated with a co-branded credit or other payment card offered by the financial institution corresponding to the financial system 140, and with whom the co-branded card provides one or more transactional or loyalty benefits specific to the merchant and to transactions associated with the merchant.

As illustrated, the merchant application 108 can include an e-commerce engine 112 allowing users to view particular items, products, and/or services offered for sale by the merchant. The e-commerce engine 112 may be a proprietary e-commerce system, or may be a sales engine or application provided by one or more software developers. The solution herein can allow users, while interacting with the application 108 and its e-commerce engine 112, to initiate an application for credit based on an offer received during the interactions at the merchant application 108. The financial system link or interface 110 provides a link or interface to a credit application site or application 146 provided by the financial system 140. When a user elects to apply for the credit offer, the merchant application 108 can direct or redirect the user to the credit application site or application 146, and allow the credit application to be completed and assessed by the backend financial system 140. Further discussion of how the application is handled or assessed is described in relation to the financial system 140 below. In some instances, when interactions with the merchant application are redirected to the credit application site or application 146, at least some of the information from the customer account 118 may be provided with the redirection. For example, the merchant application 108 can provide a merchant-specific ID 120 associated with the user, so that any responses from the financial system 140 can be linked to that ID 120 and associated with the correct customer. Additionally, personally identifiable information from the customer profile 124 may be included in the redirection, including the user's name, address, and/or any other relevant information that is available at the merchant system 102 and may be used for the credit application. In some instances, only the ID 120 of the user may be provided, and the user may be required to fill out the credit application completely at the financial system 140. In other instances, all information required for the credit application may be provided by the merchant system 102, and the user may only need to review and confirm the information pre-populated in the credit application.

As illustrated, the merchant system 102 includes one or more merchant APIs 114. The merchant APIs may be available to allow secure communications from the financial system 140 to be provided back to the merchant system 102 after the credit adjudication and credit creation processes are completed. Information provided through the merchant APIs 114 from the financial system 140 can include, but is not limited to, an indication of whether the credit application was approved or denied. If the application was approved, the information can include one or more payment or credit credentials resulting from the credit application submission and generated at the financial system 140, where those payment or credit credentials identify a particular new credit account that is usable by the merchant system 102 to complete one or more transactions, including, in some instances, the current transaction. The credentials, or any message received through the merchant APIs 114, can include a specific identification of the merchant-specific ID 120 provided in the initial request and transmission from the merchant system 102 to the financial system 140. The merchant APIs 114 can provide the received information to the merchant application 108, which can determine the corresponding customer account 118 associated with the merchant-specific ID 120, and the payment or credit credentials can be directly associated with the customer profile 124 and included in the customer's associated wallet 126. In some instances, the e-commerce engine 112 can identify the credentials and automatically perform or complete the transaction using the received credentials. By doing so, the credit approval process can immediately be followed by executing the transaction using those payment credentials. Further, those credentials can be immediately available for additional transactions.

Memory 116 of the merchant system 102 may represent a single memory or multiple memories. The memory 116 may include any memory or database module and may take the form of volatile or non-volatile memory including, without limitation, magnetic media, optical media, random access memory (RAM), read-only memory (ROM), removable media, or any other suitable local or remote memory component. The memory 116 may store various objects or data, including financial data, user and/or account information, administrative settings, password information, caches, applications, backup data, repositories storing business and/or dynamic information, and any other appropriate information associated with the merchant system 102, including any parameters, variables, algorithms, instructions, rules, constraints, or references thereto. Additionally, the memory 116 may store any other appropriate data, such as VPN applications, firmware logs and policies, firewall policies, a security or access log, print or other reporting files, as well as others. While illustrated within the merchant system 102, memory 116 or any portion thereof, including some or all of the particular illustrated components, may be located remote from the merchant system 102 in some instances, including as a cloud application or repository, or as a separate cloud application or repository when the merchant system 102 itself is a cloud-based system. As illustrated and previously described, memory 116 includes a plurality of customer accounts 118, where each customer account 118 may be associated with a corresponding merchant-specific ID 120, a shopping cart 122 identifying goods or services selected by the user in a current transaction, and a customer profile 124, where the customer profile 124 can store personally identifiable information of the customer or user based on a registered account or obtained during the current transaction, as well as information about the contents of a proprietary wallet 126 used by the customer to complete and pay for transactions with the merchant system 102 and its e-commerce engine 112.

As noted, the financial system 140 provides a backend system associated with a financial institution used to receive credit applications for credit offered through a merchant, where the application for credit can be immediately evaluated and, if approved, a corresponding new credit account can be generated. Once the credit account is generated, the financial system 140 can transmit, back to the merchant system 102 associated with the request, payment or credit credentials associated with the newly created credit account that can be used immediately to complete a current transaction as well as any future transactions. The return transmission can be associated with specific information linking the new credit credentials to a particular customer account 118 (e.g., by using the merchant-specific ID 120), such that a proprietary wallet 126 of the merchant system 102 can be populated with the new credentials.

As illustrated, the financial system 140 includes various components, including interface 142 for communication (which may be similar to or different from interface 104), at least one processor 144 (which may be similar to or different from processor(s) 106, and which can execute the functionality of the financial system 140), a credit application site 146, a credit adjudication engine 150, a credit creation engine 152, and memory 154 (which may be similar to or different from memory 116).

The credit application site 146 may be a web page, web-based application, or other software provided by or associated with the financial system 140. The credit application site 146 represents an interactive web site, form, or other interactive component at which information associated with a credit application can be submitted. The credit application site 146 may be a front-end used to receive input for the credit application, and can provide the received information to one or more backend systems, such as the credit adjudication engine 150 and the credit creation engine 152. In some instances, the credit application site 146 may receive, via a merchant interface 148, information from the merchant system 102 regarding a customer and a request for credit. In some instances, the information received from the merchant system 102 may be limited to a merchant-specific ID 120, which may be hidden from the presented credit application in some instances. In those instances, the user, via client application 178, can input the required information associated with the credit application to the credit application site 146. In other instances, a set of personally identifiable information from the customer profile 124 of the merchant system 102 may be provided via the merchant interface 148 and/or the redirection of the user to the credit application site 146. In those instances, at least some of the information from the customer profile 124 can be used to pre-populate at least a portion of the credit application. In some instances, all fields may be populated, and the user may only need to submit the application after review. The credit application site 146 may provide the user with a set of terms and conditions 166 associated with the issuance of new credit, allowing the financial institution to conform to any local, state, or federal requirements.

Once the credit application is completed and submitted, the credit application site 146 can provide the relevant information to a credit adjudication engine 150, where the credit adjudication engine 150 can perform a creditworthiness analysis based on one or more credit rules 164 defined by the financial institution (and here, stored in memory 154). The credit rules 164 can be used to determine whether the credit application is to be accepted or rejected, as well as an amount associated with the acceptance, where appropriate. The credit adjudication engine 150 can access one or more databases and credit bureaus when making its determination, and, in some cases, can provide an instantaneous or near-instantaneous decision regarding the credit application.

In response to approving the credit application, the credit adjudication engine 150 can cause a credit creation engine 152 to create a new credit account for the customer as approved during the adjudication process. The credit creation engine 152 may act as a master account management system, and can perform credit provisioning and management within the financial system 140. In some instances, the credit creation engine 152 may be a credit processing and/or management system. Based on the instructions from the credit adjudication engine 150, the credit creation engine 152 generates the new credit account 156, as well as some or all of the information associated with the customer received from the credit application, which can be stored in the account data 160. In some instances, a personal account number (PAN) 158 may be generated for the credit account 156, which may be identical to the account number of the new credit account 156, or may be an alternative identifier to be used in transactions. In many instances, the result of the credit generation process is the creation of a new, unique account number that can be used to perform one or more transactions on the new credit account. In some instances, the credit creation engine 152 can generate or otherwise obtain a payment token associated with the new credit account 156, where the payment token can be used in lieu of the account number or PAN 158 to initiate a transaction at the merchant system 102 and other systems.

Once generated, the payment credentials (e.g., a PAN and expiration information, a payment token, etc.) can be provided back to the credit application site 146 directly, via the credit adjudication engine 150, or through other suitable channels. In some instances, the payment credentials may be provided to the merchant system 102 by another secure communications channel, or by any suitable component including the credit adjudication engine 150 or the credit creation engine 152. The credit application site 146 can then, through the merchant interface 148 or another suitable mechanism, can transmit a signal back to the merchant system 102 including the new payment credentials associated with the newly created credit account 156, as well as the merchant-specific ID 120, where the new payment credentials can be stored in association with a customer account 118 corresponding to the merchant-specific ID 120 and used in further transactions. Along with the signal, instructions can be provided to redirect the current operations to the merchant application 108, where the new payment credentials are available to complete the transaction.

As illustrated, memory 154 includes a plurality of credit accounts 156, including the new credit account created after the application is approved. Each credit account 156 may be associated with a PAN 158 (e.g., a card identifier or an account identifier, which may also be associated with an expiration date), a set of account data 160, and a merchant-specific ID 162 where the credit account is generated in response to a request from a merchant system 102. Memory 154 can also store the set of credit adjudication rules 164, and a set of terms and conditions 166 to be presented. Additional and/or alternative information may be stored in or associated with memory 154.

As illustrated, one or more clients 170 may be present in the example system 100. Each client 170 may be associated with a particular customer, or may be accessed by multiple customers, where a particular customer is associated with a current session or interaction at the client 170. Client 170 may be a client device at which the customer of the customer account 118 is linked or associated, or a client device through which the particular customer a client application 178 which interacts with merchant system 102 and its e-commerce engine 112. As illustrated, the client 170 may include an interface 172 for communication (similar to or different from interface 104 and 142), at least one processor 174 (similar to or different from processor 106 and 144), a graphical user interface (GUI) 176, a client application 178, and a memory 182 (similar to or different from memory 116 and 154) storing information associated with the client 170.

The illustrated client 170 is intended to encompass any computing device such as a desktop computer, laptop/notebook computer, mobile device, smartphone, personal data assistant (PDA), tablet computing device, one or more processors within these devices, or any other suitable processing device. In general, the client 170 and its components may be adapted to execute any operating system, including Linux, UNIX, Windows, Mac OS®, Java™, Android™, or iOS. In some instances, the client 170 may comprise a computer that includes an input device, such as a keypad, touch screen, or other device(s) that can interact with one or more client applications, such as one or more mobile applications, including for example a web browser, a banking application, or other suitable applications, and an output device that conveys information associated with the operation of the applications and their application windows to the user of the client 170. Such information may include digital data, visual information, or a GUI 176, as shown with respect to the client 170. Specifically, the client 170 may be any computing device operable to communicate with the merchant system 102, the financial system 140, other clients 170, and/or other components via network 130, as well as with the network 130 itself, using a wireline or wireless connection. In general, client 170 comprises an electronic computer device operable to receive, transmit, process, and store any appropriate data associated with the environment 100 of FIG. 1.

The client application 178 executing on the client 170 may include any suitable application, program, mobile app, or other component. Client application 178 can interact with the merchant application 108, the merchant system 102 generally, the financial system 140, or portions thereof, via network 130. In some instances, the client application 178 may be a web browser, where the functionality of the client application 178 may be realized using a web application or website the user can interact with via the client application 178. In other instances, the client application 178 may be a remote agent, component, or client-side version of the merchant application 108, or a dedicated application associated with the merchant system 102. In some instances, the client application 178 may interact directly with the merchant system 102 or portions thereof. The client application 178 may be used to view, interact with, or otherwise transact data exchanges and transactions with the merchant application 108, and to allow interactions for credit application submission via the financial system 140.

GUI 176 of the client 170 interfaces with at least a portion of the environment 100 for any suitable purpose, including generating a visual representation of any particular client application 178 and/or the content associated with any components of the merchant system 102 and/or the financial system 140. In particular, the GUI 176 may be used to present screens and information associated with the merchant application 108 and transactions and interactions associated therewith, as well as credit application-related presentations associated with the financial system 140. GUI 176 may also be used to view and interact with various web pages, applications, and web services located local or external to the client 170. Generally, the GUI 176 provides the user with an efficient and user-friendly presentation of data provided by or communicated within the system. The GUI 176 may comprise a plurality of customizable frames or views having interactive fields, pull-down lists, and buttons operated by the user. In general, the GUI 176 is often configurable, supports a combination of tables and graphs (bar, line, pie, status dials, etc.), and is able to build real-time portals, application windows, and presentations. Therefore, the GUI 176 contemplates any suitable graphical user interface, such as a combination of a generic web browser, a web-enable application, intelligent engine, and command line interface (CLI) that processes information in the platform and efficiently presents the results to the user visually.

While not illustrated herein, once a new credit account is generated, the financial system 140 can trigger a physical card generation process, where a physical card is generated and can be physically delivered to the user. Any suitable process for card generation can be used, and can allow the user to use the new credit account offline and at other merchants or providers.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
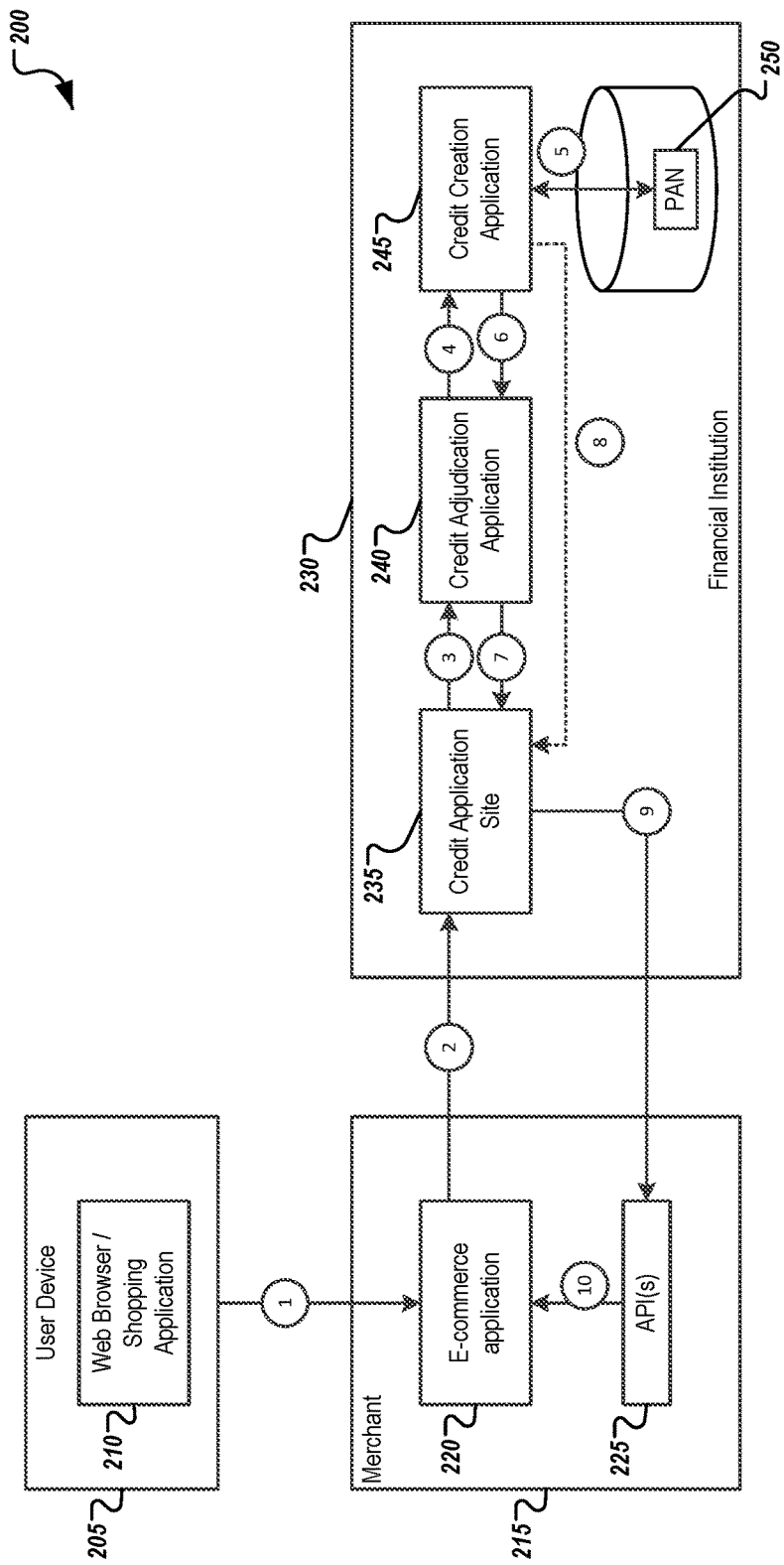
FIG. 2 illustrates a data and control flow of example interactions performed in providing credit application and provisioning operations associated with a financial institution within ongoing online interactions with one or more merchant transactions in one example of the first implementation.

FIG. 2 illustrates a data and control flow of example interactions 200 performed in providing credit application and provisioning operations associated with a financial institution within ongoing online interactions with one or more merchant transactions in one example of the first implementation. As illustrated, FIG. 2 is illustrated with interactions between a user device 205, a merchant 215, and a financial institution 230. In some instances, these may correspond to the client 170, merchant system 102, and financial system 140 of FIG. 1, respectively, although different specific implementations may be used by persons of skill in the art.

As illustrated in FIG. 2, the user device 205 may be associated with a web browser or shopping application 210, where the web browser or shopping application 210 is used to interact with an e-commerce application 220 of merchant 215. The e-commerce application 220 allows the user to view and select items from a catalog of goods and/or services for purchase, where those items can be added to an electronic shopping cart until the user is ready to complete the transaction (1). In the illustrated example, the e-commerce application 220 may be able to offer the user an opportunity to apply for a new credit account, for instance, for a credit card co-branded with the merchant 215 and a particular financial institution 230. In response to the user electing to apply for the new credit, the e-commerce application 220 can redirect the user's experience to a credit application site 235 (2).

The credit application site 235 may be a website, webpage, or web-based application at which users are able to provide inputs for a credit application for a new credit account. The credit application site 235, or credit sales site, may be a frontend page or portion of a backend application used to adjudicate credit applications and generate new credit accounts in response to credit approval. In some instances, the redirection to the credit application site 235 by the merchant 215 and its e-commerce application 220 can include a provision of information or an identifier that uniquely identifies the user as stored at the merchant 215. The identifier may be any suitable format, and may include or be associated with login information for an account of the user at the merchant 215, or can be a private value stored secretly by the merchant 215 and used to uniquely identify the user. Further, additional personally identifiable information available from the merchant 215 and useful in the credit application may be provided to the credit application site 235 by the merchant 215, and included or pre-populated into a credit application provided by the credit application site 235.

Once the credit application is completed and submitted, the credit application site 235 can provide or transmit the application to the credit adjudication application 240 (3), which can perform an analysis to determine whether the credit request is to be approved. In response to determining that the credit is approved, the credit adjudication application 240 can provide information regarding the approval (e.g., approved, a particular credit limit, etc.) to the credit creation application 245 (as shown by 4). In some instances, a merchant-specific ID may be included in the information sent.

The credit creation application 245 can create a new credit account based on the received information, including identifying a new PAN 250 or other account identifying information (at 5). The PAN 250 may be or may be associated with a set of payment credentials that can be used by the user to perform financial transactions upon the newly approved credit account. The PAN 250 and associated credit account can be associated with the merchant-specific ID, user information received from the credit application, and any other information required to provide and manage the credit account. In response to the new credit account's creation, the credit creation application can provide a set of payment credentials back to the credit adjudication application (6), which can then forward those credentials to the credit application site 235 (7). In some instances, the credit creation application 245 may directly provide that information to the credit application site 235 (as shown by 8).

The credit application site 235, or a related application, interface, or component, can then securely provide the payment credentials (e.g., a PAN and expiration date, a payment token, etc.) back to the merchant 215 and e-commerce application 220 via one or more merchant APIs 225 or other secure interfaces or secure communication channels (9). The PAN or payment credentials may be encrypted based on an encryption key pair (e.g., public/private key pair, symmetric key pair) by the credit application site 235 prior to being transmitted. In some instances, a secure connection, such as a VPN connection or other similar connection, may be used to transmit the information to the merchant API 225. In some instances, either the credit adjudication application 240 or the credit creation application 245 may manage communications back to the merchant 215 regarding credit decisions and account information and credentials via secure channels and communications.

Once received at the API 225 or at any other suitable location or interface of the merchant 215, the PAN or payment credentials may be decrypted and provided to the e-commerce application 220 (10). In some instances, the payment credentials may be received directly at the e-commerce application 220. The transmitted credentials may be sent with the merchant-specific ID of the corresponding user for whom the credit account belongs. Based on that connection, the e-commerce application 220 can associate the received credentials with the user's account at the merchant 215 (e.g., in the merchant's proprietary wallet for the user), and can allow the user to purchase a set of goods or services identified in the shopping cart immediately using those credentials. In some instances, such as where the credit application process was initiated during a checkout, the transaction can be automatically performed and finalized in response to the e-commerce application 220 receiving the payment credentials. The credit application process is not required to be performed in connection with a purchase or transaction, and can instead be performed before any other transactions are attempted. In general, the received credentials for the new credit account can be used instantly and in future transactions for performing purchases and transactions.

In some instances, either the merchant 215 or the credit application site 235 can transmit an indication of approval or rejection of the credit application to the user based on the credit adjudication process. During the credit application process, the user may be presented with information related to one or more terms and conditions associated with the requested credit account prior to the account being created and opened. If a rejection of credit is determined by the credit adjudication application 240, then a rejection notification can be returned to the e-commerce application 220 and the user device 205. Further application operations can be performed offline, until the application is approved or the request is abandoned. Once approved, the operation can begin again at 4, where the credit adjudication application 240 can notify the credit creation application 245 of the new account to be created.

FIG. 2 is meant to be an example of the flows and interactions between an example set of components performing the operations described herein. Additional, alternative, or different combinations of components, interactions, and operations may be used in different implementations. For example, information provided back to the merchant 215 via API 225 may be received through any suitable channel or communications, including secure communications directly to the e-commerce application 220 or other non-API entry points.

Figure 3:
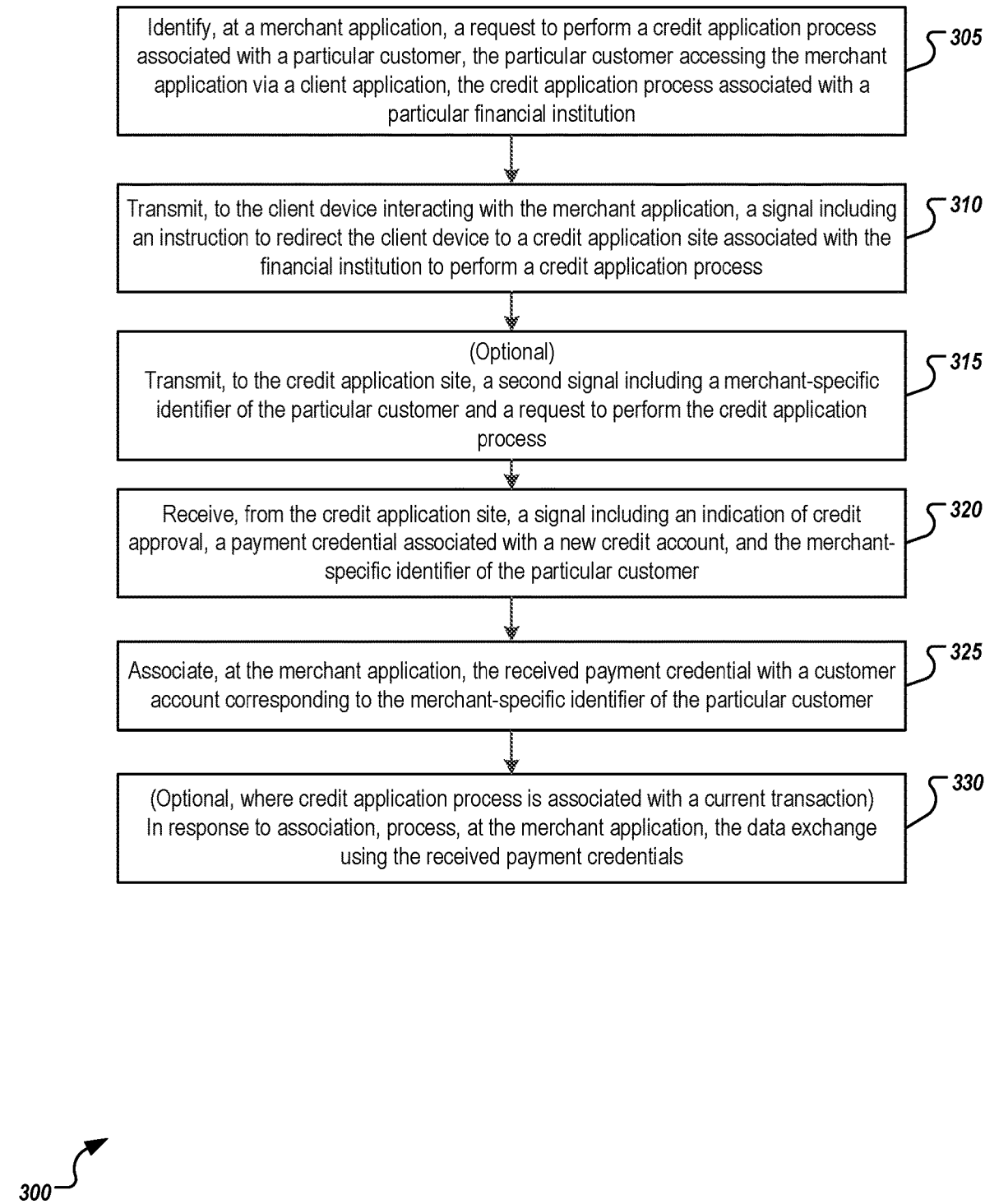
FIG. 3 is a flow diagram of an example method for automatically providing credit application and provisioning operations associated with a financial institution within ongoing online interactions with one or more merchant transactions in one example of the first implementation.

FIG. 3 is a flow diagram of an example method for automatically providing credit application and provisioning operations associated with a financial institution within ongoing online interactions with one or more merchant transactions in one example of the first implementation. However, it will be understood that method 300 may be performed, for example, by any other suitable system, environment, software, and hardware, or a combination of systems, environments, software, and hardware as appropriate. In some instances, method 300 can be performed by the merchant system 102 and/or the financial system 140, or portions thereof, described in FIG. 1, as well as other components or functionality described in other portions of this description. In other instances, method 300 may be performed by a plurality of connected components or systems, such as those illustrated in FIG. 2. Any suitable system(s), architecture(s), or application(s) can be used to perform the illustrated operations.

In one instance, method 300 describes a method performed at a merchant system at which a data exchange, or financial transaction, may be performed, as well as, in part, at a financial institution providing functionality to apply for credit. In other instances, the method may be performed without a particular financial transaction being performed or attempted, such as prior to a user adding any items to their digital shopping cart and attempting to complete the transaction. The operations described can instead be performed before the selection of any items, or before an attempt to finalize the transaction or otherwise checkout of the process. The system may include a communications module, at least one memory, and at least one hardware processor interoperably coupled with the at least one memory and the communications module. The at least one memory can store instructions and a repository storing a set of user accounts associated with a plurality of users. In some instances, each user may be associated with a user profile, where the user profile can include information about the user for use by the merchant system, in some cases, including payment credentials previously used by the user for transactions with the merchant system. The information may also include personally identifiable information for the user. Further, each user profile may be associated with a merchant-specific identifier identifying the particular user at the merchant. In some instances, that identifier may be a user name, a unique number or string, or any other suitable identifier. The memory may also store instructions that instruct the at least one hardware processor to perform particular operations.

At 305, a merchant application (e.g., an e-commerce application associated with a merchant) can identify a request to perform a credit application process in association with or received during a data exchange associated with a particular customer, as well as prior to a particular data exchange. In some instances, the credit application process can be performed without reference or association to a particular data exchange. The particular customer can access the merchant application via a client application executing at a client device, which may include a mobile device. In some instances, the merchant application may be a website or web page associated with the merchant, where the client accesses the merchant application via the client application. The credit application process can be associated with a particular financial institution, which may be responsible for managing the credit application process. In some instances, the request to perform the credit application process may be identified in response to a user interaction with an advertisement or presented offer associated with a financing or credit card offer. Further, in some instances, a particular transaction may be ongoing, such as where the user has added one or more items to an electronic shopping card associated with the merchant application, and is ready to check out and complete the transaction.

At 310, in response to identifying the request, a signal including an instruction to redirect the client device to a credit application site associated with the financial institution in order to perform a credit application process is transmitted. The credit application site may be associated with a credit application, and may be a front-end application or webpage associated with a credit adjudication application. The particular credit application site may be used for all credit applications associated with the financial institution, or specifically with a credit product associated with the merchant system, such as a co-branded payment card. In some instances, the instruction to redirect the client device may be an instruction to present the credit application site as embedded within the merchant application, such as via an iFrame or similar technology.

At 315, in some instances, an optional signal can be transmitted to the credit application site itself, where the signal includes at least the merchant-specific identifier associated with the customer or user and a request to perform the credit application process. In some instances, this signal may be transmitted concurrently with the signal of 310, or the signal of 315 may be transmitted after the signal of 310 has been sent. In some instances, the signal of 315 may be sent after the client device is redirected to the credit application site, and can then be provided via the client device. The signal of 315 can also include personally identifiable information associated with the customer from the user profile, where the personally identifiable information can be used to pre-populate a credit application provided to the customer during the credit application process.

In some instances, the information included in the signal of 315—that is, the request to perform the credit application process for the merchant-specific ID of the particular customer—may be included with or embedded within the signal of 310 and the underlying redirection request. For example, the signal of 310 may include a hyperlink to the credit application site that is to be activated or clicked on by the customer at the client device. The hyperlink can include, as parameters, or as a POST data included in a request to the client application site. In some instances, the hyperlink or other type of link can include at least some personally identifiable information associated with the customer to be used to pre-populate the credit application. In some instances, the redirection request may automatically redirect the client application to the credit application site, where the redirection includes the request to perform the credit application process, an identification of the merchant-specific ID, and, if included, a set of relevant customer information from the merchant application used to populate at least a portion of the credit application.

In some instances, additional signals may be shared between the merchant application and the credit application site during the application process. For example, the credit application site may request additional customer information relevant to the credit application being completed in response to the credit application process being initiated. These additional requests may be to obtain additional information about the customer, including more detailed merchant-specific information to be used in the credit application and the determination of whether the credit is to be approved or not. In some instances, a merchant may elect not to provide anything but the request and the merchant-specific ID initially to avoid potential interception of personally identifiable information in the initial interactions. To obtain the additional personally identifiable information, a secure communications channel may need to be created or connected to allow for the personally identifiable information to be shared from the merchant application.

In response to the transmissions, the credit application site can initiate the credit application process, such as the processes described in FIG. 1. In some instances, the credit application process may include one or more of the following. In some instances, an interactive credit application may be presented via a user interface, where information for the credit application can be provided by the customer. In some instances, at least some of the personally identifiable information received in the one of the received signals (e.g., as embedded within the request to perform the credit application process, in the optional second signal, or through any additional communication with the merchant application) may be pre-populated into the interactive credit application. The user, after reviewing the credit application, can submit the application, such as through a "submit" button. The financial institution can then initiate or perform a credit adjudication process for the user based on information included in the application for credit. In response to determining that the application is approved, a new credit account can be created at the financial institution for the user, and the account may be associated with a unique credit account identifier, which may be a personal account number for an associated payment card, or any suitable identifier. The financial institution can then, in some instances, transmit an additional signal to the merchant application including the payment credentials associated with the created credit account. The payment credentials may be the unique credit account identifier (e.g., a PAN), or may be credentials corresponding to the unique credit account identifier (e.g., a payment token).

Returning to method 300, at 320, a signal may be received from the credit application site or any other interface of the financial institution, where the third signal includes an indication of credit approval or denial, and, if the credit is approved, the payment credential associated with the new credit account created at the financial institution. The signal received at 320 may also include the merchant-specific identifier of the particular customer. In some instances, the signal of 320 may be received at a specific API associated with the merchant application used to receive and interpret information associated with one or more credit application processes performed at the financial institution. Alternatively, the signal of 320 can be received at any suitable component, endpoint, or interface of the merchant application.

At 325, the received payment credential can be associated with a customer account corresponding to the merchant-specific identifier of the particular customer received in the third signal. In some instances, the payment credential can be stored in a proprietary wallet associated with the merchant application and the particular customer, where the customer can then use that payment credential to complete one or more transactions with the merchant application. In some instances, where the credit application process was initiated in connection with an ongoing data exchange or financial transaction, such as during a checkout process, the current transaction being performed can be processed at 330 in response to associating the payment credential to the customer account. In some instances, the transaction may be processed automatically, while in others, a user indication may be required prior to the processing using the new payment credentials.

Figure 4:
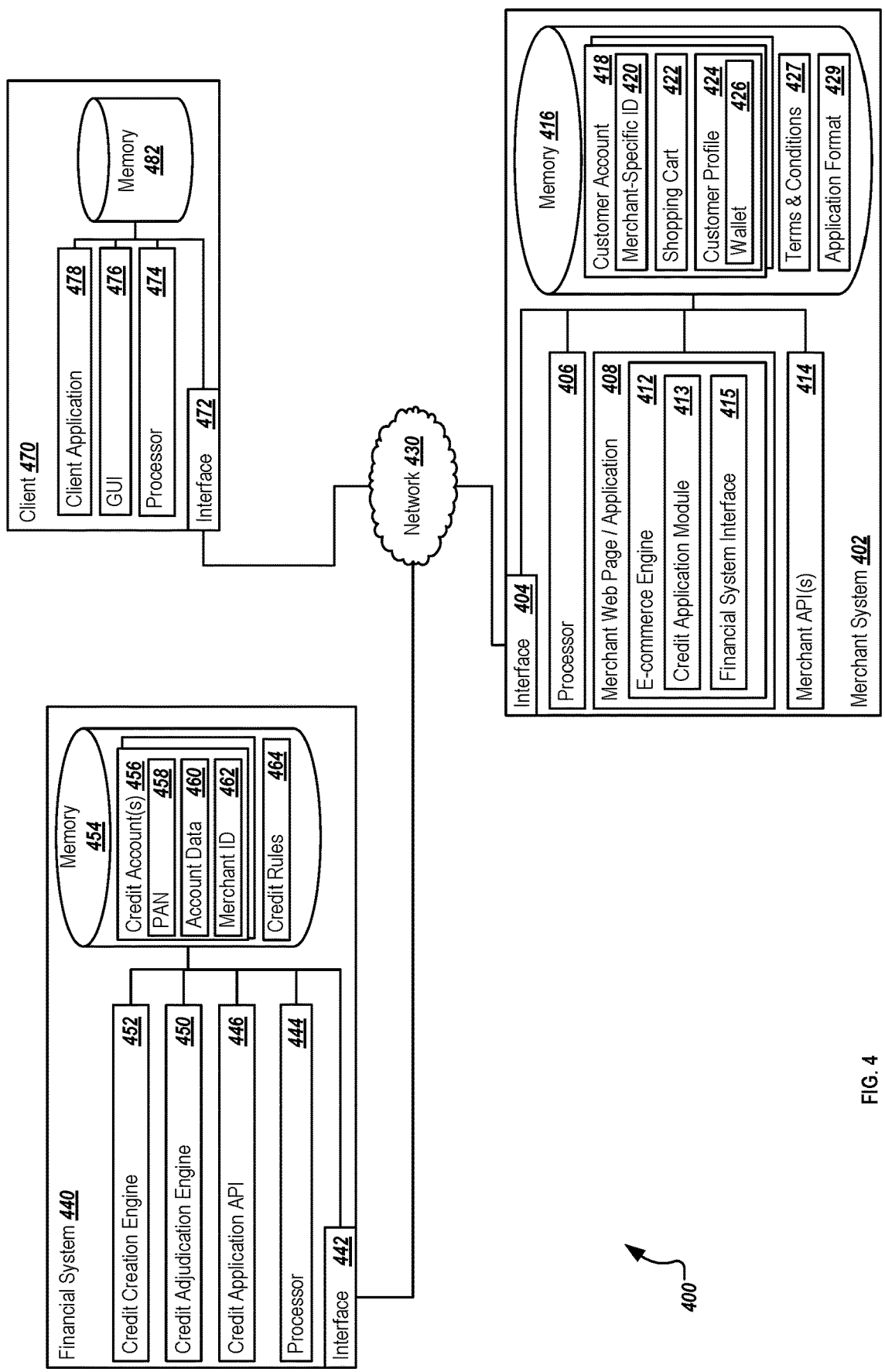
FIG. 4 is a block diagram illustrating an example system for providing credit application and provisioning operations associated with a financial institution within ongoing online interactions with one or more merchant transactions in a second implementation.

FIG. 4 illustrates the second solution described above, where the merchant can incorporate the credit application process into its merchant application and e-commerce platform, and can access one or more APIs (i.e., credit application API 446) exposed by a corresponding backend financial system 440 to access the credit application process offered by the financial institution. FIG. 4 represents a further integration of the merchant system 402 and the financial system 440, where the merchant application 408 provides the e-commerce engine 412 and a credit application module 413, where credit application data can be submitted without leaving or being redirected from the e-commerce engine 412 and the merchant application or web page 408. By allowing the merchant system 402 to host the apply and buy functionality as opposed to the financial system 440, a more seamless and transparent connection between the merchant and financial institution can be provided, such that users are provided a streamlined transaction process through the merchant's application 408.

The components and elements illustrated in FIG. 4 are similar to many of the components included in FIG. 1. The identical components may be similar to or different from those previously described in FIG. 1, or they may be alternative components. As illustrated, FIG. 4 includes a merchant system 402, a financial system 440, and a client 470, each connected via network 430.

In the illustrated system, merchant system 402 includes an interface 404 (similar to interface 104), a processor 406 (similar to processor 106), a merchant web page or application 408, one or more merchant APIs 414 (similar to merchant APIs 114), and memory 416 (similar to memory 116). The operations and functionality of the interface 404, processor 406, merchant APIs 414, and memory 416 may be similar to the corresponding components in FIG. 1.

In the illustrated example, however, a modified merchant web page or application 408 to that of merchant application 108 is provided. Specifically, merchant application 408 includes (and is illustrated within the e-commerce engine 412) a credit application module 413 or engine, which can initiate and receive information associated with a credit application submitted by a user interacting with the merchant application 408. The credit application module 413 can be modeled on a particular application format 429 provided by the financial system 440, where the application format 429 identifies a particular set of information required to perform the credit adjudication process. Integration with the financial system 440 can allow a precise and correct credit application to be presented to the user via client 470, and can ensure that the required information is included in any credit application requests transmitted back to the financial system 440. In combination with the presentation and collection of information for the credit application, a set of terms and conditions 427 may be stored or referenced within memory 416 (or available from the financial system 440). The terms and conditions 427 may be presented to the user applying for credit to ensure that all lending laws and regulations regarding credit disclosures are met. The terms and conditions 427 and application format 429 may be updated regularly with the financial system 440 to ensure that any changes to either are stored at the merchant system 402 for use in the credit application process. In some instances, at least one of the terms and conditions 427 (or a portion thereof) or the application format 429 may be determined dynamically at runtime, such as by a call to the credit application API 446 prior to presenting a credit application to the customer. In those instances, the runtime call to the credit application API 446 can allow the merchant application 408 to obtain the current application requirements and disclosure information, without requiring the merchant system 402 to be responsible for updating and managing the terms and conditions 427 and application format 429. In those instances, the return information from the financial system 440 can include an identification of particular disclosures to be provided to the customer, as well as the particular input fields required for the credit application, allowing the credit application module 413 to dynamically format the interactive form for input by the customer when completing the credit application.

In some instances, the e-commerce engine 412 may access the customer account 418 (similar to customer account 118) to access information about the customer associated with the credit application. The e-commerce engine 412 and the credit application module 413 may access the customer profile 424, for example, to identify relevant information stored by the merchant system 402 that is requested by or to be included in the credit application. In response to a request to apply for credit, the credit application module 413 can access the information and place available and relevant information into the credit application, allowing for at least some of the information to be pre-populated to allow the credit application to be completed quickly. In some instances, all information associated with the credit application may be pre-populated due to available information within the merchant system 402, while in other instances, additional information may be needed to complete the application.

Once the credit application is completed (or an indication of completion is received via user input), the e-commerce engine 412 can submit the application using a financial system interface 415. The financial system interface 415 can manage or control the sending of information related to credit applications to the financial system 440, including by initializing secure communication channels and encrypting any data to be transmitted. In the present example, the financial system interface 415 can transmit a signal including the information from the credit application to one or more credit application APIs 446 provided by the financial system 440, in the format expected by or compatible with the APIs 446. In addition to the credit application information, the signal can include a merchant-specific ID 420 of the merchant's customer associated with the request. In doing so, any responses from the financial system 440 can include or identify the corresponding merchant-specific ID 420, allowing the correct customer account 418 to be associated with any received payment credentials. As described, the communication can be performed via network 430.

The financial system 440 may be similar to financial system 140 other than the credit application site 146 of FIG. 1 is replaced by the credit application API 446 of FIG. 4 (as well as any other related modifications). The financial system 440 of FIG. 4 includes interface 442, processor 444, credit application API 446, credit adjudication engine 450, credit creation module 452, and memory 454, which can store information associated with one or more credit accounts 456, as well as credit rules 464 or other requirements for adjudicating and processing credit applications. The interface 442, processor 444, credit adjudication engine 450, credit creation engine 452, and memory 454 may be similar to or different from the components described in relation to financial system 140 of FIG. 1.

The credit application API 446 can be used as an interface to expose the credit adjudication engine 450 and credit creation engine 452 of the financial system 440 that are used to evaluate the credit application and generate a new credit account in response to system approval. The credit application API 446 can receive input from the merchant application 408 in an expected format, parse the received data, and provide a reformatted set of application data to the credit adjudication engine 450 for processing. The adjudication and credit creation processes can be similar to those described for FIG. 1. The created credit account 456 can be associated with a newly created PAN 458 or account number, can include specific account data 460 included from the application and/or determined from the credit adjudication process, and can identify or reference the merchant-specific ID 462 associated with the credit application and the user associated with the credit account 456. Similar to FIG. 1, the credit creation engine 452 can provide information about the new credit account 456 to the credit adjudication engine 450, the credit application API 446, and/or another interface capable of returning the information via the one or more merchant APIs 414. The information transmitted back to the merchant system 402 can include a payment credential (e.g., the PAN 458 associated with the account or a corresponding payment token) identifying or associated with the new credit account 456, an indication of credit acceptance and issuance, and the merchant-specific ID 420 associated with the new credit account 456.

Upon receipt via the merchant APIs 414 (or any other communication channel from the financial system 440), the merchant application 408 and merchant system 402 can associate the newly-received payment credentials with a proprietary wallet 426 associated with the customer account 418, allowing those credentials to be used immediately and for future interactions. In some instances, in response to receiving the payment credentials, the e-commerce engine 412 may automatically perform the transaction associated with a set of goods or services included in a current shopping cart 422. In other instances, the transaction can be prepared using the new payment credentials, and can be initiated in response to user confirmation via a user interface (e.g., GUI 476).

Client 470 may be similar to client 170 of FIG. 1, and can include an interface 472, processor 474, GUI 476, client application 478, and memory 482, which may be similar to those described with regard to the corresponding elements of FIG. 1.

While portions of the elements illustrated in FIG. 4 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 5:
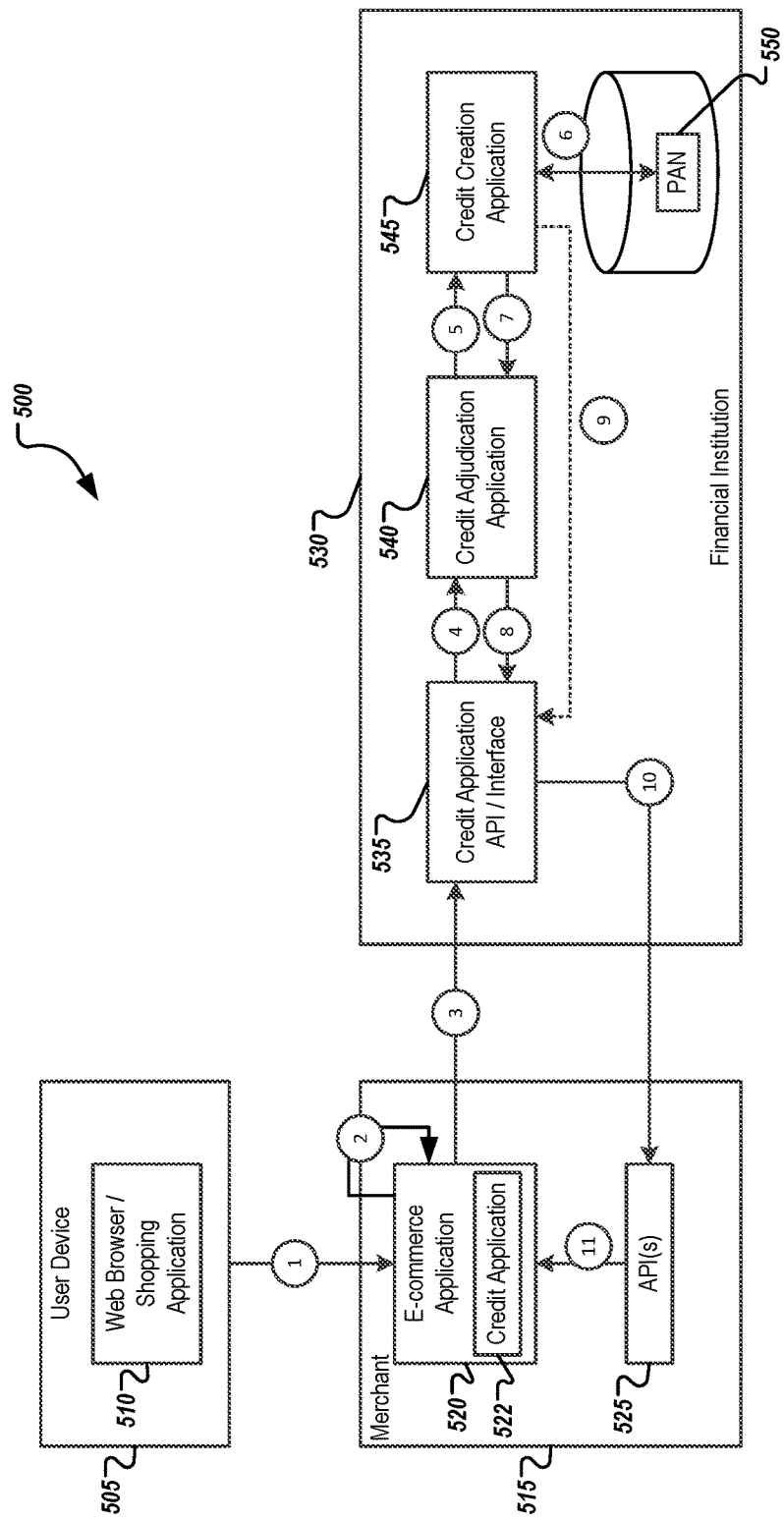
FIG. 5 illustrates a data and control flow of example interactions performed in providing credit application and provisioning operations associated with a financial institution within ongoing online interactions with one or more merchant transactions in one example of the second implementation.

FIG. 5 illustrates a data and control flow of example interactions 500 performed in providing credit application and provisioning operations associated with a financial institution within ongoing online interactions with one or more merchant transactions in one example of the second implementation. As illustrated, FIG. 5 is illustrated with interactions between a user device 505, a merchant 515, and a financial institution 530. In some instances, these may correspond to the client 470, merchant system 402, and financial system 440 of FIG. 4, respectively, although different specific implementations may be used by persons of skill in the art.

As illustrated in FIG. 5, the user device 505 may be associated with a web browser or shopping application 510, where the web browser or shopping application 210 is used to interact with an e-commerce application 520 of merchant 515. The e-commerce application 520 allows the user to view and select items from a catalog of goods and/or services for purchase, where those items can be added to an electronic shopping cart until the user is ready to complete the transaction (1). In some instances, however, the e-commerce application 520 can allow the credit application to be submitted before any items are selected to the shopping cart, and/or before a checkout process or other transaction completion process is initiated. In the illustrated example, the e-commerce application 520 may be able to offer the user an opportunity to apply for a new credit account, for instance, for a credit card co-branded with the merchant 515 and a particular financial institution 530. In response to the user electing to apply for the new credit, the e-commerce application 520 can provide, at or associated with the e-commerce application 520, a credit application 522 corresponding to a credit application API or interface 535. The credit application 522 can be formatted based on the requirements of a financial institution's credit adjudication application 540, such that the information requested by the credit application 522 meets the requirements necessary to process the credit adjudication.

In some instances, the e-commerce application 520 may access customer account information pre-populate at least a portion of the credit application 522 (at 2). For example, information stored in or associated with a customer account at the merchant 515 can be used to populate at least a portion of the credit application 522, such as the user's name, mailing address, email address, employment information, income level, and other information previously associated with the customer account. By providing the credit application 522 at the merchant 515, a more seamless transaction process can be offered to users without requiring a redirect or shift to a credit application site associated with the financial institution 530. In some instances, the merchant 515 can provide any required terms and disclosures to the user for acceptance prior to applying for the credit.

In some instances, the e-commerce application 520 can request from the credit application API 535, or another financial institution link or interface, information identifying the current set of information required for the credit application 522. In such instances, the required fields can be dynamically determined at runtime, removing the need for the merchant 515 to be responsible for maintaining and/or continually monitoring the current status of the credit application 522 as required by the financial institution 530. Additionally, similar requests may be used for any required disclosures to be presented to customers during the interactions. In both cases, the financial institution 530 can provide information regarding the text and information to be displayed, both for the credit application 522 itself and the disclosures to be presented as required by associated laws and regulations.

Once the credit application 522 is completed and/or is associated with an indication of completion (e.g., user input clicking a submit button), the e-commerce application 520 can transmit the content of the application, as well as a merchant-specific identifier associated with the user applying for the credit, to the credit application API or interface 535 (3). The credit application API 535 exposes the credit adjudication application 540 of the financial institution 530, while allowing the merchant 515 to manage the application process. As compared to FIG. 2, the solution of FIG. 5 removes the need to redirect users from their interactions with the e-commerce application 520, instead allowing the e-commerce application 520 to provide the credit application 522 and associated information to the backend processes for evaluating the application and, if approved, generating the new credit account. In some instances, the credit application API 535 and/or the credit adjudication application 540 may determine that additional customer information from the merchant 515 may be needed. In such instances, the credit application API 535 and/or the credit adjudication application 540 can interact or communicate with the merchant 515 to request and, if available, receive the additional information from the merchant 515.

The credit application API 535 can provide (at 4) the relevant application information to the credit adjudication application 540, which can determine whether or not credit is to be offered to the user associated with the application. In response to a credit approval, the credit adjudication application 540 can provide information related to the approval to the credit creation application 545 (at 5), which can then create a new credit account based on the received information (at 6), which can include identifying or generating a new PAN 550 or other account identifier. Similar to FIG. 2, the PAN 550 may be or may be associated with a set of payment credentials that can be used by the user to perform financial transactions upon the newly approved credit account. The PAN 550 and associated credit account can be associated with the merchant-specific ID, user information received from the credit application, and any other information required to provide and manage the credit account. In response to the new credit account's creation, the credit creation application can provide a set of payment credentials back to the credit adjudication application (at 7), which can then forward those credentials to the credit application API or interface 535 (at 8). In some instances, the credit creation application 545 may directly provide that information to the credit application API 535 (at 9).

The credit application API 535, or a related interface or application, can then securely provide the payment credentials (e.g., a PAN and expiration date, a payment token, etc.) back to the merchant 515 and e-commerce application 520 via one or more merchant APIs 525 or other interfaces (10), similar to the previously-described processes.

Once received at the API 525, the PAN or payment credentials may be processed and provided to the e-commerce application 520 (11). The transmitted credentials can be sent with the merchant-specific ID of the corresponding user for whom the new credit account belongs or is associated. Based on that connection, the e-commerce application 520 can associate the received credentials with the user's account at the merchant 515 (e.g., in the merchant's proprietary wallet for the user), and can allow the user to purchase a set of goods or services identified in the shopping cart immediately using those credentials. In some instances, such as where the credit application process was initiated during a checkout, the transaction can be automatically performed and finalized in response to the e-commerce application 520 receiving the payment credentials. In general, the received credentials for the new credit account can be used instantly and in future transactions for performing purchases and transactions.

Figure 6:
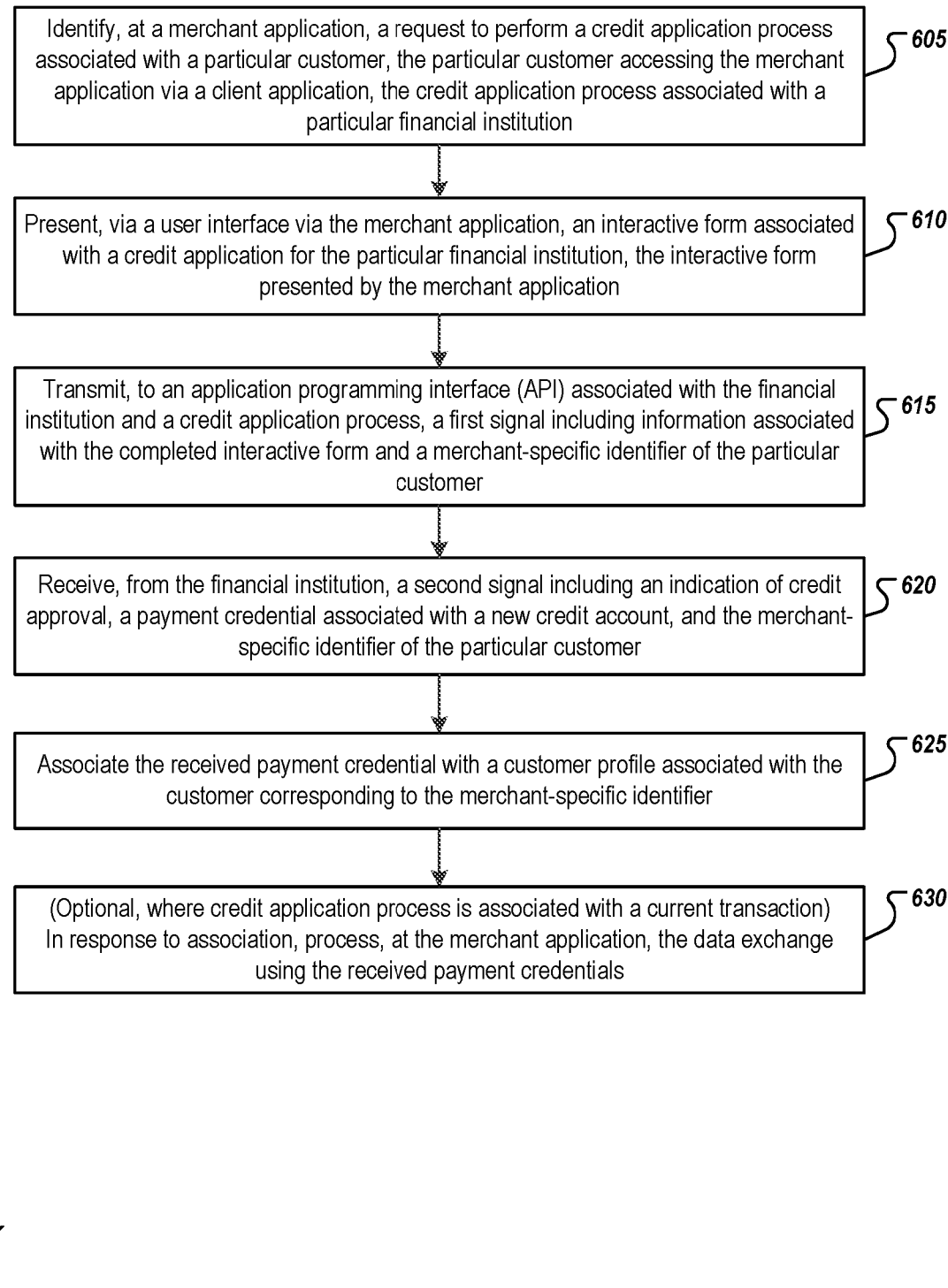
FIG. 6 is a flow diagram of an example method for automatically providing credit application and provisioning operations associated with a financial institution within ongoing online interactions with one or more merchants transactions in one example of the second implementation.

FIG. 6 is a flow diagram of an example method 600 for automatically providing credit application and provisioning operations associated with a financial institution within ongoing online interactions with one or more merchant transactions in one example of the second implementation. However, it will be understood that method 600 may be performed, for example, by any other suitable system, environment, software, and hardware, or a combination of systems, environments, software, and hardware as appropriate. In some instances, method 600 can be performed by the merchant system 402 and/or the financial system 440, or portions thereof, described in FIG. 4, as well as other components or functionality described in other portions of this description. In other instances, method 400 may be performed by a plurality of connected components or systems, such as those illustrated in FIG. 5. Any suitable system(s), architecture(s), or application(s) can be used to perform the illustrated operations.

In one instance, method 600 describes a method performed at a merchant system at which a data exchange, or financial transaction, may be performed, as well as, in part, at a financial institution providing functionality to apply for credit. The system may include a communications module, at least one memory, and at least one hardware processor interoperably coupled with the at least one memory and the communications module. The at least one memory can store instructions and a repository storing a set of user accounts associated with a plurality of users. In some instances, each user may be associated with a user profile, where the user profile can include information about the user for use by the merchant system, in some cases, including payment credentials previously used by the user for transactions with the merchant system. The information may also include personally identifiable information for the user. Further, each user profile may be associated with a merchant-specific identifier identifying the particular user at the merchant. In some instances, that identifier may be a user name, a unique number or string, or any other suitable identifier. The memory may also store instructions that instruct the at least one hardware processor to perform particular operations.

At 605, a merchant application (e.g., an e-commerce application associated with a merchant) can identify a request to perform a credit application process in association with or received during a data exchange associated with a particular customer, as well as prior to a particular data exchange. In some instances, the credit application process can be performed without reference or association to a particular data exchange, as well. The particular customer can access the merchant application via a client application executing at a client device, which may include a mobile device. In some instances, the merchant application may be a website or web page associated with the merchant, where the client accesses the merchant application via the client application. The credit application process can be associated with a particular financial institution, which may be responsible for managing the credit application process. In some instances, the request to perform the credit application process may be identified in response to a user interaction with an advertisement or presented offer associated with a financing or credit card offer. Further, in some instances, a particular transaction may be ongoing, such as where the user has added one or more items to an electronic shopping card associated with the merchant application, and is ready to check out and complete the transaction, although an ongoing transaction is not required to perform the operations of method 600.

At 610, in response to the identified request to perform the credit application process, an interactive form associated with a credit application for the particular financial institution can be presented via a user interface associated with or included in the merchant application. Restated, the merchant application can provide the application for credit without redirecting the customer to a third-party site or application. In some instances, the fields included in the interactive form may be defined by the financial institution. In some instances, presenting the interactive form may include requesting, via the API associated with the financial institution, a set of fields required for inclusion in the credit application. In response to the request, the set of fields required for inclusion in the credit application may be received, and the interactive form can be dynamically generated by the merchant application based on the response to include the received set of fields required for inclusion in the credit application. In some instances, the response may include formatting instructions, while in other instances, the merchant application can format the interactive form itself. In some instances, a current set of disclosure requirements may be obtained with the required fields, and can be presented based on the dynamic determination to the customer. In some instances, presenting the interactive form associated with the credit application for the particular financial institution can include accessing the customer or user profile stored in the repository to identify or obtain a set of personally identifiable information associated with the customer. In turn, at least a portion of the obtained set of information may be pre-populated into at least a portion of the interactive form, such that at least part of the form for the credit application is automatically filled. If necessary, addition information can be received via user input received through a user interface at a client device and included in the credit application.

At 615, a first signal including information associated with or included in the completed and submitted interactive form can be transmitted, via the communications interface, to a credit application process API of the financial institution. The first signal can also include a merchant-specific identifier of the particular customer, so that any processing and responsive communications from the financial institution can be linked to the correct user or customer profile. Based on the first signal and its contents, the credit application process at the financial institution can be performed.

In response to the transmission and the information in the first signal, the financial institution can initiate the credit application process, such as the processes described in FIG. 4. In some instances, the credit application process may include one or more of the following. The first signal, as described, can be received via the API associated with the financial institution and credit application process. Based on the information from the completed application, a credit adjudication process for the user can be performed. In some instances, additional information may be needed for the credit adjudication process to be performed. In those instances, a secure communication channel or interaction may be generated with the merchant application, and a request for additional information can be requested. The merchant application, if allowed by the customer and/or the terms of service and privacy policy, can respond to the request and provide the additional information to the API and/or the credit adjudication process and associated components. In response to approval of the application for credit by the credit adjudication process, the new credit account can be created at the financial institution for the user, and the account may be associated with a unique credit account identifier, which may be a personal account number for an associated payment card, or any suitable identifier. The financial institution can then, in some instances, transmit a second signal to the merchant application including the payment credentials associated with the created credit account. The payment credentials may be the unique credit account identifier (e.g., a PAN), or may be credentials corresponding to or associated with the unique credit account identifier (e.g., a payment token). The third signal can, in some instances, be sent to one or more merchant APIs provided for receiving the credit adjudication and credit application process results. The third signal could also be sent to any suitable entry point or interface associated with the merchant application. Further, in some instances, the financial institution may determine that additional information may be needed for the credit application after receiving the first signal. In those instances, additional interactions between the financial institution and the merchant application may occur, including one or more requests from the financial institution to the merchant application for additional customer-associated or customer-relevant information, with one or more responses with such information, where available and otherwise allowed, returned to the financial institution.

Returning to method 600, at 620 a second signal may be received from the financial institution, where the second signal includes an indication of credit approval or denial, and, if the credit is approved, the payment credential associated with the new credit account created at the financial institution. The second signal may also include or be associated with the merchant-specific identifier of the particular customer profile. In some instances, the second signal may be received at specific API associated with the merchant application, where the API can receive and interpret information associated with one or more credit application processes performed at the financial institution.

At 625, the received payment credential can be associated with a customer account corresponding to the merchant-specific identifier of the particular customer received in the second signal. In some instances, the payment credential can be stored in a proprietary wallet associated with the merchant application and the particular customer, where the customer can then use that payment credential to complete one or more transactions with the merchant application. In some instances, where the credit application process was initiated in connection with an ongoing data exchange or financial transaction, such as during a checkout process, the current transaction being performed can be processed at 630 in response to associating the payment credential to the customer account. In some instances, the transaction may be processed automatically, while in others, a user indication may be required prior to the processing.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   at least one memory storing instructions and a repository storing a set of user accounts associated with a plurality of users, wherein each of the plurality of users is associated with a user profile, wherein each user profile is associated with a merchant-specific identifier identifying the user profile at a merchant;
   at least one hardware processor interoperably coupled with the at least one memory, wherein the instructions instruct the at least one hardware processor to:
   receive, at a merchant application and based on interactions received from a particular user during a current transaction being conducted at the merchant application via a client application, a request to perform a credit application process associated with the particular user, wherein the credit application process is associated with and performed by a particular institution;
   provide for display, via a user interface and within the merchant application, a dynamically-generated interactive form and current disclosure information associated with a credit application for the particular institution, wherein providing the dynamically-generated interactive form for display, comprises:
   selecting, using an API of the financial institution and for the credit application requested based on the interactions, the current disclosure information and current application requirements corresponding to the credit application, wherein the selection is based on a plurality of application requirements and a plurality of disclosure forms received from the financial system over a particular time period;
   determining, based on the current application requirements, a current set of user input fields for inclusion on the interactive form; and
   dynamically formatting the current set of user input fields for display on the interactive form;
   obtain, from the user profile of the particular user stored in the repository, a set of personally identifiable information about the particular user;
   transmit, from the merchant application and to a device having an application programming interface (API) associated with the particular institution, a first signal including data for performing the credit application process, wherein the data comprises (1) information entered by the particular user into the interactive form associated with the credit application, (2) a portion of the obtained set of personally identifiable information, and (3) the merchant-specific identifier of the particular user, wherein the API is associated with the credit application process performed by the particular institution;

receive, by the merchant application and from the particular institution, a second signal including an approval associated with the credit application process, a payment credential associated with a new credit account created at the particular institution in response to the approval of the credit application process, and the merchant-specific identifier of the particular user;

in response to receiving the second signal, associate, by the merchant application and using the merchant-specific identifier, the received payment credential to the user profile associated with the particular user corresponding to the received merchant-specific identifier, wherein associating the received payment credential to the user profile associated with the particular user includes storing the received payment credential in a proprietary wallet associated with the merchant and the user profile associated with the particular user corresponding to the received merchant-specific identifier; and after associating the received payment credential to the user profile associated with the particular user, process, at the merchant application, the current transaction using the received payment credential as a form of payment for the current transaction, and wherein processing the current transaction includes selecting the received payment credential from the proprietary wallet without any manual entry of identifying information of the received payment credential.

2. The system of claim 1, wherein the instructions further instruct the at least one hardware processor to:

accessing the user profile of the particular user to obtain the set of personally identifiable information associated with the particular user; and pre-populating at least a portion of the interactive form with the portion of the obtained set of personally identifiable information.

3. The system of claim 2, wherein the instructions further instruct the at least one hardware processor to receive, via a user interface, additional user input providing additional information to the interactive form associated with the credit application.

4. The system of claim 1, wherein the instructions further instruct the at least one hardware processor to:

receive, at the particular institution and via the API associated with the particular institution, the first signal;

perform, by the particular institution, the credit adjudication process for the user based on information included in the first signal;

in response to approval of the application for credit by the credit adjudication process, create, by the particular institution, the new credit account at the particular institution for the user, the credit account associated with a unique credit account identifier; and transmit, to the merchant application and from the particular institution, the second signal including the payment credentials of the created credit account, wherein the payment credentials correspond to the unique credit account identifier associated with the created credit account.

5. The system of claim 1, wherein the received payment credential comprises a personal account number and expiration date of a payment card associated with the new credit account.

6. The system of claim 1, wherein the received payment credential comprises a payment token associated with the new credit account.

7. The system of claim 1, wherein receiving the second signal comprises receiving the second signal via at least one application programming interface associated with the merchant application.

8. The system of claim 1, wherein the instructions further instruct the at least one hardware processor to automatically perform a data exchange using the received payment credential after associating the received payment credential to the user profile.

9. A non-transitory, computer-readable medium storing computer-readable instructions executable by a computer and configured to:

receive, at a merchant application and based on interactions received from a particular user during a current transaction being conducted at the merchant application via a client application, a request to perform a credit application process associated with the particular user, wherein the credit application process is associated with and performed by a particular institution, wherein the merchant application is associated with a non-transitory memory storing a repository storing a set of user accounts associated with a plurality of users, wherein each of the plurality of users is associated with a user profile, and wherein each user profile is associated with a merchant-specific identifier identifying the user profile at a merchant;

provide for display, via a user interface and within the merchant application, a dynamically-generated interactive form and current disclosure information associated with a credit application for the particular institution, wherein providing the dynamically-generated interactive form for display, comprises:

selecting, using an API of the financial institution and for the credit application requested based on the interactions, the current disclosure information and current application requirements corresponding to the credit application, wherein the selection is based on a plurality of application requirements and a plurality of disclosure forms received from the financial system over a particular time period;

determining, based on the current application requirements, a current set of user input fields for inclusion on the interactive form; and dynamically formatting the current set of user input fields for display on the interactive form;

obtain, from the user profile of the particular user stored in the repository, a set of personally identifiable information about the particular user;

transmit, from the merchant application and to a device having an application programming interface (API) associated with the particular institution, a first signal including data for performing the credit application process, wherein the data comprises (1) information entered by the particular user into the interactive form associated with the credit application, (2) a portion of the obtained set of personally identifiable information, and (3) the merchant-specific identifier of the particular user, wherein the API is associated with the credit application process performed by the particular institution;

receive, by the merchant application and from the particular institution, a second signal including an approval associated with the credit application process, a payment credential associated with a new credit account created at the particular institution in response to the approval of the credit application process, and the merchant-specific identifier of the particular user;

in response to receiving the second signal, associate, by the merchant application and using the merchant-specific identifier, the received payment credential to the user profile associated with the particular user corresponding to the received merchant-specific identifier, wherein associating the received payment credential to the user profile associated with the particular user includes storing the received payment credential in a proprietary wallet associated with the merchant and the user profile associated with the particular user corresponding to the received merchant-specific identifier; and after associating the received payment credential to the user profile associated with the particular user, process, at the merchant application, the current transaction using the received payment credential as a form of payment for the current transaction, and wherein processing the current transaction includes selecting the received payment credential from the proprietary wallet without any manual entry of identifying information of the received payment credential.

10. The computer-readable medium of claim 9, wherein the instructions are further configured to :

accessing the user profile of the particular user to obtain the set of personally identifiable information associated with the particular user; and pre-populating at least a portion of the interactive form with the portion of the obtained set of personally identifiable information.

11. The computer-readable medium of claim 10, wherein the instructions are further configured to receive, via a user interface, additional user input providing additional information to the interactive form associated with the credit application.

12. The computer-readable medium of claim 9, wherein the instructions are further configured to :

receive, at the particular institution and via the API associated with the particular institution, the first signal;

perform, by the particular institution, the credit adjudication process for the user based on information included in the first signal;

in response to approval of the application for credit by the credit adjudication process, create, by the particular institution, the new credit account at the particular institution for the user, the credit account associated with a unique credit account identifier; and transmit, to the merchant application and from the particular institution, the second signal including the payment credentials of the created credit account, wherein the payment credentials correspond to the unique credit account identifier associated with the created credit account.

13. The computer-readable medium of claim 9, wherein the received payment credential comprises a personal account number and expiration date of a payment card associated with the created credit account or a payment token associated with the created credit account.

14. The computer-readable medium of claim 9, wherein the computer is configured to automatically perform a data exchange using the received payment credential after associating the received payment credential to the user profile.

15. A computerized method performed by one or more processors, the method comprising:

receiving, at a merchant application and based on interactions received from a particular user during a current transaction being conducted at the merchant application via a client application, a request to perform a credit application process associated with the particular user, wherein the credit application process is associated with and performed by a particular institution, wherein the merchant application is associated with a non-transitory memory storing a repository storing a set of user accounts associated with a plurality of users, wherein each of the plurality of users is associated with a user profile, and wherein each user profile is associated with a merchant-specific identifier identifying the user profile at a merchant;

providing for display, via a user interface and within the merchant application, a dynamically-generated interactive form and current disclosure information associated with a credit application for the particular institution, wherein providing the dynamically-generated interactive form for display, comprises:

selecting, using an API of the financial institution and for the credit application requested based on the interactions, the current disclosure information and current application requirements corresponding to the credit application, wherein the selection is based on a plurality of application requirements and a plurality of disclosure forms received from the financial system over a particular time period;

determining, based on the current application requirements, a current set of user input fields for inclusion on the interactive form; and dynamically formatting the current set of user input fields for display on the interactive form;

obtaining, from the user profile of the particular user stored in the repository, a set of personally identifiable information about the particular user;

pre-populating at least a portion of the interactive form with a portion of the obtained set of personally identifiable information about the particular user;

transmitting, from the merchant application and to a device having an application programming interface (API) associated with the particular institution, a first signal including data for performing the credit application process, wherein the data comprises (1) information entered by the particular user into the interactive form associated with the credit application, (2) the portion of the obtained set of personally identifiable information, and (3) the merchant-specific identifier of the particular user, wherein the API is associated with the credit application process performed by the particular institution;

receiving, by the merchant application and from the particular institution, a second signal including an approval associated with the credit application process, a payment credential associated with a new credit account created at the particular institution in response to the approval of the credit application process, and the merchant-specific identifier of the particular user;

in response to receiving the second signal, associating, by the merchant application and using the merchant-specific identifier, the received payment credential to the user profile associated with the particular user corresponding to the received merchant-specific identifier, comprising storing the received payment credential in a proprietary wallet associated with the merchant and the user profile associated with the particular user corresponding to the received merchant-specific identifier; and after associating the received payment credential to the user profile associated with the particular user, processing, at the merchant application, the current transactions using the received payment credential as a form of payment for the current transaction, wherein processing the current transaction includes selecting the received payment credential from the proprietary wallet without any manual entry of identifying information of the received payment credential.

16. The computerized method of claim 15, further comprising:

accessing the user profile of the particular user to obtain the set of personally identifiable information associated with the particular user; and pre-populating at least a portion of the interactive form with the portion of the obtained set of personally identifiable information.

17. The system of claim 1, wherein the set of personally identifiable information about the particular user comprises at least one of (i) a name, (ii) an address, (iii) demographic information, (iv) employment information, or (v) customer preferences.

18. The system of claim 1, wherein the second signal comprises a set of terms and conditions for inclusion in the credit application from the particular financial institution.

19. The system of claim 1, wherein the one or more disclosures comprises terms and conditions associated with the credit application.

* * * * *

UNITED STATES PATENT AND TRADEMARK OFFICE
CERTIFICATE OF CORRECTION

| | | |
|---|---|---|
| PATENT NO. | : 11,688,003 B2 | |
| APPLICATION NO. | : 16/135278 | |
| DATED | : June 27, 2023 | |
| INVENTOR(S) | : Adrian Bloy et al. | |

It is certified that error appears in the above-identified patent and that said Letters Patent is hereby corrected as shown below:

On the Title Page

Item (73), under Assignee, Line 1, Delete "Toronto" and insert -- Toronto (CA) --.

In the Claims

Claim 10: In Column 33, Line 20, delete "to :" and insert -- to: --.

Claim 12: In Column 33, Line 43, delete "to :" and insert -- to: --.

Signed and Sealed this
Twenty-sixth Day of March, 2024

Katherine Kelly Vidal
*Director of the United States Patent and Trademark Office*